United States Patent
Shimizu et al.

(10) Patent No.: US 6,682,826 B2
(45) Date of Patent: Jan. 27, 2004

(54) MAGNETIC RECORDING MEDIUM, METHOD OF MANUFACTURING THEREFOR, AND MAGNETIC READ/WRITE APPARATUS

(75) Inventors: Kenji Shimizu, Ichihara (JP); Akira Sakawaki, Ichihara (JP); Hiro Mochizuki, Ichihara (JP); Hiroshi Sakai, Ichihara (JP); Soichi Oikawa, Kawasaki (JP); Takashi Hikosaka, Kawasaki (JP)

(73) Assignees: Showa Denko K.K., Tokyo (JP); Toshiba Corporation, Tokyo (JP)

( * ) Notice: Subject to any disclaimer, the term of this patent is extended or adjusted under 35 U.S.C. 154(b) by 11 days.

(21) Appl. No.: 10/202,096

(22) Filed: Jul. 25, 2002

(65) Prior Publication Data

US 2003/0170500 A1 Sep. 11, 2003

Related U.S. Application Data

(60) Provisional application No. 60/311,816, filed on Aug. 14, 2001.

(30) Foreign Application Priority Data

Aug. 1, 2001 (JP) ......................................... 2001-234119

(51) Int. Cl.$^7$ ................................................ G11B 5/667
(52) U.S. Cl. ...................... 428/611; 428/660; 428/663; 428/666; 428/667; 428/668; 428/212; 428/409; 428/694 TS; 428/694 TR
(58) Field of Search ................................. 428/611, 660, 428/663, 666, 667, 668, 212, 409, 694 TS, 694 TR

(56) References Cited

U.S. PATENT DOCUMENTS

| 4,722,869 A | * | 2/1988 | Honda et al. ................. 428/611 |
| 4,745,005 A | * | 5/1988 | Sugita et al. ................. 427/128 |
| 4,798,765 A | * | 1/1989 | Ishizaka et al. .............. 428/336 |
| 5,738,927 A | * | 4/1998 | Nakamura et al. ........... 428/141 |
| 5,759,682 A | * | 6/1998 | Ouchi et al. ................. 428/332 |
| 2002/0071967 A1 | * | 6/2002 | Do et al. ................. 428/694 TS |

* cited by examiner

*Primary Examiner*—Paul Thibodeau
*Assistant Examiner*—Kevin M. Bernatz
(74) *Attorney, Agent, or Firm*—Sughrue Mion, PLLC

(57) ABSTRACT

The present invention provides a magnetic recording medium having excellent magnetic read/write characteristics and thermal stability, a method of manufacturing therefor, and a magnetic read/write apparatus. The magnetic recording medium comprises a soft magnetic undercoat film, an orientation control film, a perpendicular magnetization film, and a protective film, that are formed on a non-magnetic substrate, wherein the orientation control film has an hcp structure and, at the same time, Δθ50 of the (0002) orientation plane is set within a range from 3 to 10 degrees and a difference (Δθ50 (mag)–Δθ50 (ori)) between Δθ50 (ori) of the orientation control film and Δθ50 (mag) of the perpendicular magnetization film is set within a range from 1 to 8 degrees.

14 Claims, 6 Drawing Sheets

20; MAGNETIC RECORDING MEDIUM
22; MAGNETIC HEAD

MAGNETIC RECORDING MEDIUM, METHOD OF MANUFACTURING THEREFOR, AND MAGNETIC READ/WRITE APPARATUS

CROSS-REFERENCE TO RELATED APPLICATION

This application claims the benefit pursuant to 35 U.S.C. §119(e) (1) of U.S. Provisional Application, No. 60/311,816 filed Aug. 14, 2001.

BACKGROUND OF THE INVENTION

1. Field of the Invention

The present invention relates to a magnetic recording medium, a method of manufacturing therefor, and a magnetic read/write apparatus that uses the magnetic recording medium.

2. Description of the Related Art

The in-plane magnetic recording medium has been widely used wherein the axis of easy magnetization in a magnetic film is generally oriented parallel to the substrate. In the in-plane magnetic recording medium, there is a possibility of medium noise increasing under the influence of diamagnetism in the boundary of recording pits when the recording density is increased. In the perpendicular magnetic recording medium of which axis of easy magnetization in the magnetic film is generally oriented perpendicular to a substrate, in contrast, recording magnetic domains that have clear boundaries can be formed due to smaller influence of diamagnetism in the boundary of recording pits even when the recording density is increased, and therefore, thermal decay and noise characteristics can be improved, resulting in much attention to the perpendicular magnetic recording medium.

Recently, there has been increasing demands for high-density recording in the magnetic recording medium. For this reason, such a magnetic recording medium has been proposed as a layer made of a soft magnetic material, called a soft back layer, is provided between a perpendicular magnetization film that serves as a recording layer and a substrate so as to improve the efficiency of the flow or the magnetic flux between a single pole type head and the magnetic recording medium, in order to use the single pole type head that has high capability of writing in the perpendicular magnetization film.

However, even when the soft back layer is provided, the magnetic recording medium does not have satisfactory performance in the read/write characteristics, thermal stability and the resolution of recording, and therefore a magnetic recording medium that is better in these characteristics has been required.

Japanese Patent No. 2769511 proposes to control the orientation dispersion angle $\Delta\theta50$ of the c axis of the crystal orientation promotion layer within 7 degrees, while Japanese Patent Application, First Publication No. Hei 6-76260 proposes to control the orientation dispersion angle $\Delta\theta50$ of the c axis of the fcc structure within 10 degrees.

However, it is not sufficient to control the orientation dispersion angle of the crystal orientation promotion layer within a particular angle, for the purpose of improving the characteristics of the perpendicular magnetization film.

Taking account of the growth in the early stage of forming the perpendicular magnetization film at the interface between the crystal orientation promotion layer and the perpendicular magnetization film, there is a possibility of the crystal grain diameter of the magnetic film increasing when the difference in orientation between the crystal orientation promotion layer and the perpendicular magnetization film is small. When the difference in orientation is too large, on the other hand, the portion of the perpendicular magnetization film provided by the early growth becomes too thick, leading to deterioration in the read/write characteristics and in the thermal stability.

When the orientation dispersion is controlled to proper values in the crystal orientation promotion layer and in the perpendicular magnetization film, it is made possible to promote the nucleation during the growth of the perpendicular magnetization film and to form microcrystals, while keeping the portion formed by the early growth from becoming thicker, thereby preventing the thermal stability from deteriorating.

Under the above-described circumstances, the present invention has been made, and an object thereof is to provide a magnetic recording medium, that is capable of recording and replaying at a higher density by improving the read/write characteristics, a method of manufacturing therefor, and a magnetic read/write apparatus.

SUMMARY OF THE INVENTION

The magnetic recording medium of the present invention comprises at least a soft magnetic undercoat film made of a soft magnetic material, an orientation control film that controls the orientation of a film provided directly above, a perpendicular magnetization film of which axis of easy magnetization is generally oriented perpendicular to a substrate, and a protective film, that are provided on a non-magnetic substrate, wherein the orientation control film has an hcp structure and, at the same time, $\Delta\theta50$ of the (0002) orientation plane is set within a range from 3 to 10 degrees and a difference ($\Delta\theta50$ (mag)–$\Delta\theta50$ (ori)) between $\Delta\theta50$ (ori) of the orientation control film and $\Delta\theta50$ (mag) of the perpendicular magnetization film is set within a range from 1 to 8 degrees.

The orientation control film can be made in a construction that contains equal to or greater than 50 at % of one or more kinds of elements selected from Ti, Zn, Y, Zr, Ru, Re, Gd, Tb and Co.

The orientation control film can be made in a construction that contains one or more kinds of elements selected from V, Cr, Mn, Fe, Co and Ni.

The orientation control film can be made in a construction that contains one or more kinds of elements selected from B, C, N, O and P.

According to the present invention, such a construction may be employed as a non-magnetic intermediate film is provided between the orientation control film and the perpendicular magnetization film, while the non-magnetic intermediate film is made of a material containing 40 to 70 at % of Co.

The orientation control film can be provided so as to have granular structure and have a mean crystal grain diameter from 4 to 20 nm.

The magnetic recording medium of the present invention may have such a construction that comprises at least a soft magnetic undercoat film made of a soft magnetic material, an orientation control film that controls the orientation of a film provided directly above, a perpendicular magnetization film of which axis of easy magnetization is generally oriented perpendicular to a substrate, and a protective film, that are provided on a non-magnetic substrate, wherein the orientation control film has an fcc structure and, at the same time, Δθ50 of the (111) orientation plane is set within a range from 3 to 10 degrees and a difference (Δθ50 (mag)–Δθ50 (ori)) between Δθ50 (ori) of the orientation control film and Δθ50 (mag) of the perpendicular magnetization film is set within a range from 1 to 8 degrees.

Negative nucleation field (–Hn) of the perpendicular magnetization film is preferably equal to or higher than 0(Oe).

The method of manufacturing the magnetic recording medium of the present invention comprises forming at least a soft magnetic undercoat film made of a soft magnetic material, an orientation control film that controls the orientation of a film provided right above, a perpendicular magnetization film of which axis of easy magnetization is generally oriented perpendicular to the substrate, and a protective film, on the non-magnetic substrate, while controlling so that the orientation control film has an hcp structure and, at the same time, Δθ50 of the (0002) orientation plane is set within a range from 3 to 10 degrees and the difference (Δθ50 (mag)–Δθ50 (ori) between Δθ50 (ori) of the orientation control film and Δθ50 (mag) of the perpendicular magnetization film is set within a range from 1 to 8 degrees.

The magnetic read/write apparatus of the present invention comprises the magnetic recording medium and a magnetic head that records information on the magnetic recording medium and replays the information therefrom, wherein the magnetic recording medium comprises at least the soft magnetic undercoat film made of a soft magnetic material, the orientation control film that controls the orientation of a film provided right above, the perpendicular magnetization film of which axis of easy magnetization is generally oriented perpendicular to the substrate and the protective film that are provided on the non-magnetic substrate, and the orientation control film has an hcp structure and, at the same time, Δθ50 of the (0002) orientation plane is set within a range from 3 to 10 degrees and the difference (Δθ50 (mag)–Δθ50 (ori)) between Δθ50 (ori) of the orientation control film and Δθ50 (mag) of the perpendicular magnetization film is set within a range from 1 to 8 degrees.

DETAILED DESCRIPTION OF THE INVENTION

Figure 1:
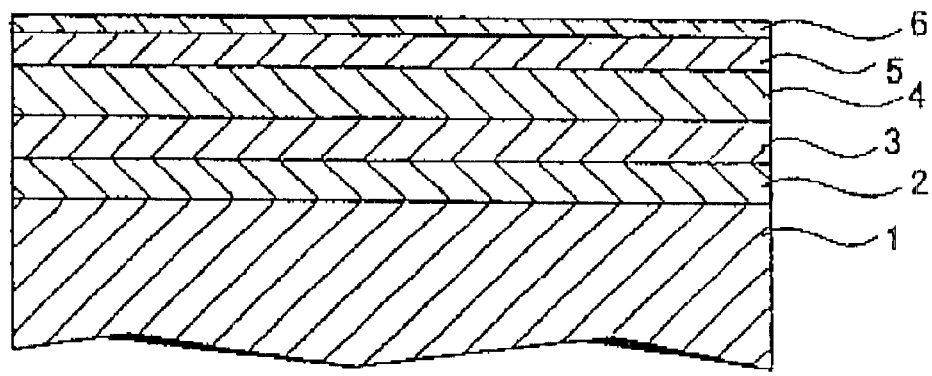
FIG. 1 is a partially sectional view showing the first embodiment of a magnetic recording medium of the present invention.

FIG. 1 shows the first embodiment of the present invention. The magnetic recording medium shown here has a structure in which a soft magnetic undercoat film 2, an orientation control film 3, a perpendicular magnetic film 4, a protective film 5 and a lubrication film 6 are formed on a non-magnetic substrate 1.

Examples of the non-magnetic substrate 1 are aluminum alloy substrates, glass substrates (crystallized glass, amorphous strengthened glass, and the like), ceramic substrates, carbon substrates, silicon substrates, and silicon carbide substrates that have a NiP plating generally used as a magnetic recording medium substrate. In addition, examples of substrates can be given in which the NiP film is formed on these substrates by a plating method, sputtering method, or the like.

The mean surface roughness Ra of the substrate 1 is preferably within a range from 0.01 to 2 nm (more preferably from 0.05 to 1.5 nm).

In the case that the mean surface roughness Ra falls below the above range, adhesion of the magnetic head to the medium and magnetic head vibration during replay occur easily. In addition, when the mean surface roughness Ra exceeds the above range, the glide characteristics easily become insufficient.

The soft magnetic undercoat film 2 is provided in order to establish more firmly the magnetization of the perpendicular magnetic film 4, that records the information, in a direction perpendicular to the substrate 1.

An Fe alloy having an Fe content equal to or higher than 60 at % can be used as the soft magnetic material that forms the soft magnetic undercoat film 2. Examples of this material include FeCo alloys (FeCo, FeCoV and the like), FeNi alloys (FeNi, FeNiMo, FeNiCr, FeNiSi and the like), FeAl alloys (FeAl, FeAlSi, FeAlSiCr, FeAlSiTiRu and the like), FeCr alloys (FeCr, FeCrTi, FeCrCu and the like), FeTa alloys (FeTa, FeTaC and the like), FeC alloys, FeN alloys, FeSi alloys, FeP alloys, FeNb alloys, and FeHf alloys.

The soft magnetic undercoat film 2 can be composed of microcrystals comprising FeAlO, FeMgO, FeTaN, FeZrN or the like. In addition, it can also have a granular structure in which the microcrystals are dispersed in a matrix.

The Co content of the soft magnetic undercoat film 2 is equal to or higher than 80 at %, and a Co alloy incorporating at least one or more of Zr, Nb, Ta, Cr, Mo or the like can be used. For example, CoZr, CoZrNb, CoZrTa, CoZrCr, and CoZrMo can be used advantageously.

In addition, the soft magnetic undercoat film 2 may comprise an alloy having an amorphous structure.

The saturation magnetic flux density Bs of the soft magnetic undercoat film 2 is preferably equal to or higher than 0.8 T. When the saturation magnetic flux density Bs falls below 0.8 T, the control of the replay waveform becomes difficult, the film must be made thick, and this invites lowering of the production efficiency.

The coercive force of the soft magnetic undercoat film 2 is preferably equal to or less than 200(Oe) ($15.8 \times 10^3$ A/m). When the coercive force exceeds the above range, noise increases.

The thickness of the soft magnetic undercoat film 2 is appropriately set depending on the saturation magnetic flux density Bs of the material that forms the soft magnetic undercoat film 2.

Specifically, Bs·t, that is the product of the saturation magnetic density Bs of the material that forms the soft magnetic undercoat film 2 and the film thickness t of the soft magnetic undercoat film 2, is preferably equal to or greater than 30 T·nm (more preferably equal to or greater than 60 T·nm).

It is preferred that the surface of the soft magnetic undercoat film 2 (the plane of the orientation control film 3 side) that forms the soft magnetic undercoat film 2 be partially or completely oxidized.

The thickness of this oxidized portion (oxidized film) is preferably equal to or greater than 0.1 nm and less than 3 nm.

The condition of oxidation of the soft magnetic undercoat film 2 can be confirmed by Auger electronic spectroscopy, SIMS, or the like. The thickness of the oxidized portion (oxidized film) of the surface of the soft magnetic undercoat film 2 can be found, for example, by a transmission electron microscope (TEM) photograph of a cross-section of the medium.

The orientation control film 3 is a film provided for controlling the orientation and crystal grain diameter of the perpendicular magnetic film 4 provided directly above.

In the magnetic recording medium of the present embodiment, the orientation control film 3 is composed of the material having an hcp structure.

Examples of materials of the orientation control film 3 include those having a content equal to or greater than 50 at % of one or more kinds of Ti, Zn, Y, Zr, Ru, Re, Gd, Tb and Co.

Among these materials, at least one of Ru and Re is preferably used.

Intermetallic compounds having a hcp structure, for example, 25Ag75Ge, 50Cu50Ge and 75Ru25Nb are also preferred.

Examples of these materials include those having a content equal to or greater than 50 at % of one or more kinds of Ti, Zn, Y, Zr, Ru, Re, Gd, Tb and Co, and one or more kinds of V, Cr, Mn, Fe, Co and Ni. Specific examples are RuCr, RuCo, ReV, ZrNi and RuCrMn.

In the orientation control film 3, the content of V, Cr, Mn, Fe, Co and Ni is preferably set to be equal to or greater than 0.1 and less than 50 at %.

Examples of materials of the orientation control film 3 include those having a content equal to or greater than 50 at % of one or more kinds of Ti, Zn, Y, Zr, Ru, Re, Gd, Tb and Co, and one or more kinds of B, C, N, O and P. Specific examples are RuB, RuC, ZrN and ReBO.

In the orientation control film 3, the content of B, C, N, O and P is preferably set to be equal to or greater than 0.1 and less than 50 at %.

It is also possible to use, in the orientation control film 3, alloys having a content equal to or higher than 50 at % of one or more of Ti, Zn, Y, Zr, Ru, Re, Gd, Tb and Co, and one or more kinds of Si oxide, Zr oxide, Ti oxide, and Al oxide.

Specific examples are Ru—$SiO_2$, Ru—$ZrO_2$ and Re—$Al_2O_3$.

In the orientation control film 3, the content of the above oxides (at least one of Si oxide, Zr oxide, Ti oxide and Al oxide) is preferably set to be equal to or greater than 0.1 and less than 40 at %.

The orientation control film 3 can be made in a construction that has a granular structure in which the microcrystals are dispersed in a matrix.

A mean crystal grain diameter of these crystal grains is preferably set within a range from 4 to 20 nm. In the case that the crystal grain diameter falls below the above range, the thermal decay decrease. In addition, when the mean crystal grain diameter exceeds above range, the noise characteristics deteriorate.

The term "thermal decay" refer to properties relating to a decrease in output caused by thermal stability.

In the magnetic recording medium of the present embodiment, $\Delta\theta 50$ of the (0002) orientation plane of the orientation control film 3 is preferably within a range from 3 to 10 degrees (more preferably from 4 to 8 degrees).

When $\Delta\theta 50$ of the orientation control film 3 falls below the above range, the read/write characteristics deteriorate. In addition, when it exceeds the above range, the thermal decay deteriorate.

As used herein, the term "$\Delta\theta 50$" means inclined distribution of the film and specifically refers to a half-value of a peak of a rocking curve relating to the specific orientation plane on the surface of the orientation control film 3. The smaller the numerical value of $\Delta\theta 50$, the higher the crystal orientation of the film.

An example of the method of measuring $\Delta\theta 50$ relating to the (0002) orientation plane of the surface of the orientation control film 3 will now be described.

(1) Determination of Peak Position

Figure 2:
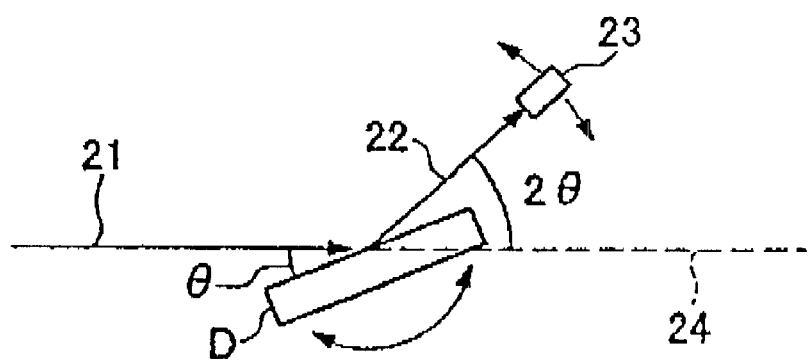
FIG. 2 is an explanatory view for explaining a method of measuring Δθ50.

As shown in FIG. 2, a disk D, in which an orientation control film 3 has been formed in the outermost side, is irradiated with an incident X-ray 21 and a diffraction X-ray 22 is detected by a diffraction X-ray detector 23.

The position of the detector 23 is set so that the angle of the diffraction X-ray 22 detected by the detector 23 to the incident X-ray 21 (the angle of the diffraction X-ray 22 to an extension line 24 of the incident X-ray 21) becomes two times larger than an incident angle θ of the incident X-ray 21 to the surface of the disk D, that is, 2 θ.

The intensity of the diffraction X-ray 22 is measured by the detector 23 using a θ–2θ scanning method wherein, during the irradiation with the incident X-ray 21, the incident angle θ of the incident X-ray 21 is changed by changing the direction of the disk D and, at the same time, the position of the detector 23 is charged while maintaining the angle of the diffraction X-ray 22 to the incident X-ray 21 at 2θ (the angle that is two times lager than the incident angle θ of the incident X-ray 21).

Consequently, a relationship between θ and the intensity of the diffraction X-ray 22 is examined, thereby to determine the position of the detector 23, where the intensity of the diffraction X-ray 22 becomes maximum. The angle 2θ of the diffraction X-ray 22 at this position of the detector to the incident X-ray 21 refers to 2θp.

The crystal plane, that is dominant in the orientation control film 3, can be determined from the resulting angle 2θp.

(2) Determination of Rocking Curve

Figure 3:
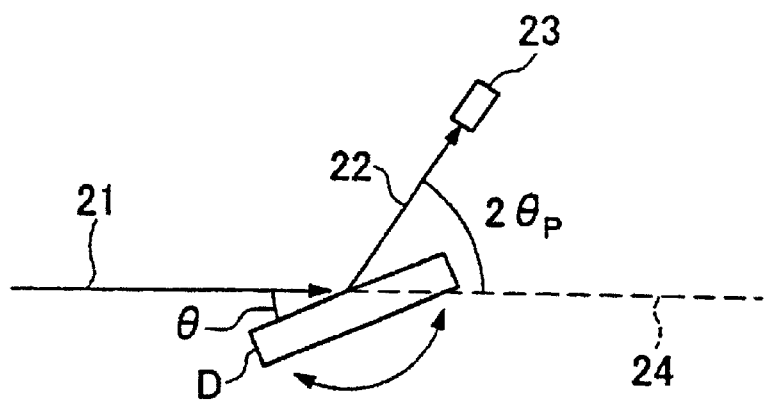
FIG. 3 is an explanatory view for explaining a method of measuring Δθ50.

As shown in FIG. 3, the incident angle θ of the incident X-ray 21 is changed by changing the direction of the disk D in the state that the detector 23 is fixed to the position where the angle 2θ of the diffraction X-ray 22 became 2θp, thereby making a rocking curve showing a relationship between the incident angle θ and the intensity of the diffraction X-ray 22 detected by the detector 23.

Since the position of the detector 23 is fixed to the position where the angle 2θ of the diffraction X-ray 22 became 2θp, the rocking curve shows the distribution of gradient of the crystal plane of the surface of the orientation control film 3 to the plane of the disk D.

Figure 4:
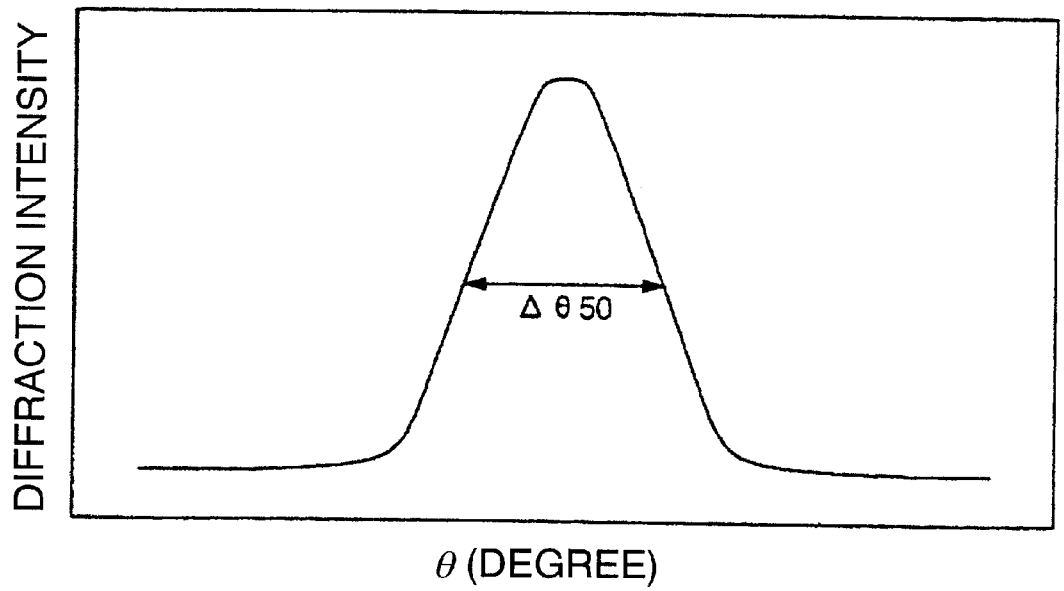
FIG. 4 is a graph showing an example of a rocking curve.

FIG. 4 is a graph showing an example of the rocking curve. The term "Δθ50" refers to a half-value width of a peak that shows the orientation plane in this rocking curve.

The thickness of the orientation control film 3 is preferably equal to or less than 50 nm (more preferably equal to or less than 30 nm).

When the film thickness exceeds the above range, the diameter or the crystal grains in the orientation control film 3 become large, and the magnetized grains in the perpendicular magnetic film 4 can easily become coarse. In addition, the distance between the magnetic head and the soft magnetic undercoat film 2 becomes large during replay, and the resolution of the replay signal decreases and the noise characteristics deteriorate, which is not preferable.

The orientation control film 3 is preferably formed so that its thickness is equal to or higher than 0.1 nm because if it is too thin, the crystal orientation of the perpendicular magnetic film 4 deteriorates, and the replay characteristics deteriorate.

The perpendicular magnetic film 4 is a magnetic film, of which axis of easy magnetization is generally oriented perpendicular to the substrate, and using a Co alloy in the perpendicular magnetic film 4 is preferable.

Examples of the Co alloy are CoCrPt alloy and CoPt alloy. These alloys can be doped with at least one element selected from Ta, Zr, Nb, Cu, Re, Ru, V, Ni, Mn, Ge, Si, B, O and N.

The perpendicular magnetic film 4 can be can have a single layer structure that is uniform in the thickness direction, or can have a multiple layer structure in which a layer comprising a transition metal (Co, Co alloy) and a layer comprising a noble metal (Pt, Pd, or the like) are laminated. In the transition metal layer, Co can also be used, or a Co alloy such as CoCrPt alloy, CoPt alloy or the like can be used.

The thickness of the perpendicular magnetic film 4 can be appropriately optimized according to the target replay output, but in the case of either a single layer structure or a multiple layer structure, in the case in which the perpendicular magnetic film 4 is too thick, problems such as the deterioration of noise characteristics and a decrease in resolution occur easily, and thus the thickness is preferably equal to or higher than 100 nm (more preferably 8 to 100 nm).

The difference (Δθ50 (mag)−Δθ50 (ori)) between Δθ50 (ori) of the orientation control film 3 and Δθ50 (mag) of the perpendicular magnetization film 4 is set within a range from 1 to 8 degrees (preferably from 2 to 6 degrees).

When the difference (Δθ50 (mag)−Δθ50 (ori)) falls below the range, the noise characteristics deteriorate. In addition, when the difference exceeds the range, the thermal decay deteriorate.

The term "Δθ50 (mag)" of the perpendicular magnetic film 4 refers to Δθ50 of the (0002) orientation plane.

In addition, the negative nucleation field (−Hn) of the perpendicular magnetic film 4 is preferably equal to or higher than 0(Oe). When the negative nucleation field (−Hn) falls below the above range, the thermal stability decreases.

Figure 5:
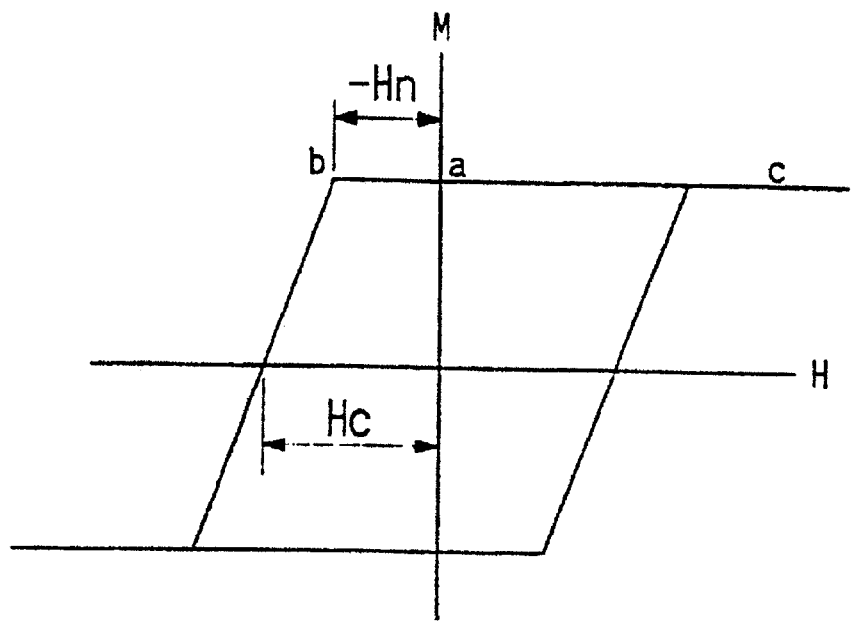
FIG. 5 is a graph showing an example of a hysteresis loop.

As shown in FIG. 5, the negative nucleation field (−Hn) is the numerical value represented by the distance (Oe) from the point "a" at which the external magnetic field becomes 0 to the point "b" at which the rate of magnetization decrease rapidly becomes high in the process of decreasing the external magnetic field from a saturated state of the magnetization (for example, the position indicated by reference symbol c) in a hysteresis loop.

Figure 6:
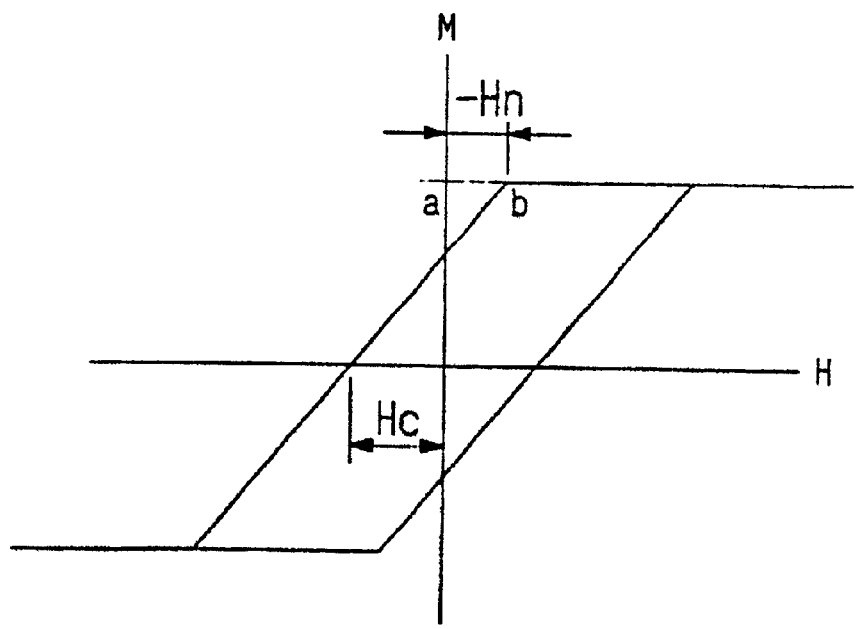
FIG. 6 is a graph showing another example of a hysteresis loop.

Moreover, the negative nucleation field (−Hn) takes a positive value in the case that the point "b" at which the rate of magnetization decreases rapidly becomes high is in a region in which the external magnetic field becomes negative (see FIG. 6), and conversely, takes a negative value in the case in which this point is in a region in which the external magnetic field becomes positive (see FIG. 5).

In the measurement of the negative nucleation field (−Hn), a disk comprising only the substrate 1, the orientation control film 3, the perpendicular magnetic film 4 and the protective film 5 is used to remove an influence of the soft magnetic undercoat film 2 and the measurement is preferably conducted using a vibrating sample magnetometer (VSM) or a Kerr effect measuring apparatus. Using the magnetic recording medium as it is, the negative nucleation field (−Hn) can also be measured using the vibrating sample magnetometer (VSM) or the Kerr effect measuring apparatus.

The protective film 5 is for preventing corrosion of the perpendicular magnetic film 4, and at the same time, prevents damage to the medium surface when the magnetic head comes into contact with the medium, and preserves the lubricating characteristics between the magnetic head and the medium. Conventionally well-known materials can be used.

For example, a composition of only C, $SiO_2$, or $ZrO_2$ or one that uses these as the major constituent while incorporating other elements can be used.

The thickness of the protective film 5 is preferably within a range from 1 to 10 nm.

A well-known lubricant such as perfluoropolyether, fluorinated alcohol, fluorinated carboxylic acid, or the like can be used in the lubrication film 6. The type and thickness can be appropriately set depending on the protective film and the lubricant that are used.

In the manufacture of the magnetic recording medium having the construction described above, the soft magnetic undercoat film 2 is formed on the substrate 1 shown in FIG. 1 by a sputtering method, next an oxidizing treatment is carried out on the surface of the soft magnetic undercoat film 2 when necessary, and then the orientation control film 3 and the perpendicular magnetic film 4 are formed in sequence by a sputtering method.

In the case where an oxidizing treatment is carried out on the surface of the soft magnetic undercoat film 2, after forming the soft magnetic undercoat film 2, a method in which the soft magnetic undercoat film 2 is exposed to a gas that includes oxygen or a method that introduces oxygen into the process gas when forming the portion of the film at the surface of the soft magnetic undercoat film 2 can be used.

Due to the surface oxidation of the soft magnetic undercoat film 2, the magnetic fluctuation of the surface of the soft magnetic undercoat film 2 can be suppressed, and the effect can be obtained wherein the noise characteristics are improved by making the crystal grains of the orientation control film 3 that is formed on the soft magnetic undercoat film 2 more fine.

Due to the oxidized portion (oxidized layer) of the surface of the soft magnetic undercoat film 2, the transfer of corrosive materials from the soft magnetic undercoat film 2 to the medium surface can be suppressed, and the occurrence of corrosion of the medium surface can be prevented.

To set Δθ50 within the above range (from 3 to 10 degrees) in the formation of the orientation control film 3, for example, there can be employed the method of optimizing the temperature, the process gas pressure, the film-forming rate, and the distance between the target and the substrate during the formation of the orientation control film 3 using the sputtering method.

To set Δθ50 within the above range, the temperature condition during the formation of the orientation control film 3 is preferably within a range from 100 to 300° C. The pressure of the process gas is preferably set within a range from 0.3 to 20 Pa. The film-forming rate is preferably set within a range from 1 to 10 nm/sec. The distance between the target and the substrate is preferably set within a range from 20 to 150 mm.

In the case where the conditions such as temperature, process gas pressure, film-forming rate, and distance between the target and the substrate fall below or exceed the above range, Δθ50 becomes too small or large, and the noise characteristics, the magnetic read/write characteristics, and the thermal decay sometimes deteriorate.

In the case in which the perpendicular magnetic film 4 having a single layer structure (that is uniform in the thickness direction) is formed, the perpendicular magnetic film 4 can be formed using a target made of a material that forms the perpendicular magnetic film 4.

In the case in which the perpendicular magnetic film 4 having a multiple layer structure is formed, the perpendicular magnetic film 4 is composed by alternatively laminating a first target made of a transition metal (Co, Co alloy) and a second target made of a noble metal (Pt, Pd) using the sputtering method.

As a formation method for the protective film 5, a sputtering method that uses a carbon target, a CVD method, or an ion beam method can be used.

There can also be applied the method of forming the protective film 5 made of $SiO_2$ or $ZrO_3$ using a RF sputtering method that uses a target made of $SiO_2$ or $ZrO_3$, or a reacting sputtering method that uses gas containing oxygen as the process gas.

In the case that the CVD method or the ion beam method is used, because a protective film 5 having an extremely high hardness can be formed, it can be made much thinner in comparison to a protective film formed by a sputtering method. Thus, the spacing loss during replay is small, and high-density replay can be carried out.

Next, the lubrication film 6 is formed using a deep coating method or a spin coating method.

In the magnetic recording medium of the present invention, since the orientation control film 3 has an hcp structure and, at the same time, Δθ50 of the specific orientation plane (0002) is set within a range from 3 to 10 degrees, and a difference (Δθ50 (mag)−Δθ50 (ori)) between Δθ50 (ori) of the orientation control film 3 and Δθ50 (mag) of the perpendicular magnetization film 4 (hereinafter referred to as a difference in Δθ50) is set within a range from 1 to 8 degrees, the noise characteristics and read/write characteristics increase and excellent thermal stability are obtained. Therefore, high-density read/write becomes possible.

The reason why excellent magnetic characteristics can be obtained by setting Δθ50 of the orientation control film 3 with the above range will now be examined.

The present inventors have intensively researched about the reason and found that Δθ50 of the orientation control film 3 exerts a large influence on the magnetic cluster size in the perpendicular magnetization film 4.

In the case in which Δθ50 of the orientation control film 3 is too small, the orientation of magnetization in the perpendicular magnetization film 4 becomes uniform and the magnetic bond between magnetic grains increases. As a result, the magnetic cluster size increases and the medium noise increase regardless of the magnetic crystal grain diameter, resulting in deterioration of the magnetic read/write characteristics.

In the case in which Δθ50 of the orientation control film 3 is too large, since the crystal orientation deteriorates in the perpendicular magnetization film 4, deterioration of magnetic anisotropy and deterioration of a squareness ratio occurred, resulting in deterioration of the thermal stability.

In contrast, in the case in which Δθ50 of the orientation control film 3 is set within a range from 3 to 10 degrees, the orientation of the perpendicular magnetic film 4 is improved, thereby improving the thermal decay, making the direction of the axis of easy magnetization nonuniform to some extent and suppressing the interaction of magnetization, thus making it possible to obtain excellent noise characteristics and read/write characteristics.

Although the reason why excellent magnetic characteristics can be obtained by setting the difference between the Δθ50 of the orientation control film and the Δθ50 of the perpendicular magnetization film within a range from 1 to 8 degrees is not certain, the following may be hypothesized.

In the case in which the construction of the crystal of the material of the orientation control film 3 (crystal structure and lattice constant) is the same as or similar to the construction of the crystal of the material of the perpendicular magnetization film 4, the difference in Δθ50 between the orientation control film 3 and the perpendicular magnetization film 4 decreases.

In such a case, it is considered that positions capable of providing a chance of forming crystal grain boundaries in these interfaces decrease because there is no large difference in state of atomic arrangement between the orientation control film 3 and the perpendicular magnetization film 4.

Therefore, it becomes difficult to form crystal grain boundaries at the initial growth stage of the perpendicular magnetization film 4. As a result, crystal grains become nonuniform and coarse, resulting in deterioration of the noise characteristics.

In the case in which the orientation control film 3 and the perpendicular magnetization film 4 drastically differ in construction of the crystal of the material (crystal structure and lattice constant), the difference in Δθ50 between the orientation control film 3 and the perpendicular magnetization film 4 markedly increases.

In this case, since disorder of the crystal structure occurs at the initial grow stage of the perpendicular magnetization film 4, crystals having drastically deteriorated orientation are formed and, therefore, deterioration of output characteristics due to a decrease in coercive force and deterioration of magnetic read/write characteristics due to a decrease in resolution are liable to occur.

In the case that the construction of the crystal of the material of the orientation control film 3 (crystal structure and lattice constant) is slightly different from the construction of the crystal of the material of the perpendicular magnetization film 4, that is, the crystal orientation of the perpendicular magnetization film 4 is slightly nonuniform (so that the difference in Δθ50 becomes about 1 to 8 degrees) as compared with the orientation control film 3, it is considered that positions capable of providing a chance of forming crystal grain boundaries in these interfaces increase because there is a difference in state of atomic arrangement between the orientation control film 3 and the perpendicular magnetization film 4.

Therefore, formation of crystal grain boundaries are promoted at the initial growth stage of the perpendicular magnetization film 4. As a result, crystal grains become uniform and fine in the perpendicular magnetization film 4 and the noise characteristics are improved.

Furthermore, deterioration of the thermal decay can be prevented by reducing the disorder of the crystal as small as possible at the initial growth stage of the perpendicular magnetization film 4.

The reasons described above makes it possible to hypothesize that the thermal decay can be improved by setting the difference in $\Delta\theta50$ within the above range without deteriorating the noise characteristics and read/write characteristics.

Since the soft magnetic undercoat film 2 is provided, a magnetic circuit is formed between the magnetic head and the soft magnetic undercoat film 2 during recording and replay and the efficiency of the flow of the magnetic flux in the magnetic head increases. Therefore, high-density read/write becomes possible.

According to the method of manufacturing the magnetic recording medium, since the orientation control film 3 has an hcp structure and, at the same time, $\Delta\theta50$ of the (0002) orientation plane is set within a range from 3 to 10 degrees and the difference in $\Delta\theta50$ is set within a range from 1 to 8 degrees, excellent thermal decay can be obtained without deteriorating the noise characteristics and the magnetic read/write characteristics. Therefore, high-density recording becomes possible.

Next, the second embodiment of the magnetic recording medium of the present invention will be described with reference to FIG. 1.

In the magnetic recording medium of the present embodiment, the orientation control film 3 is made of a material having an fcc structure.

Examples of materials of the orientation control film 3 having an fcc structure include those having a content equal to or higher than 50 at % of one or more kinds of Ni, Cu, Pd, Ag, Pt, Ir, Au and Al.

Specific examples are NiCr, Ni, Au—SiO$_2$, Cu and PdB.

In this orientation control film 3, $\Delta\theta50$ of the (111) orientation plane is set within a range from 3 to 10 degrees.

When $\Delta\theta50$ of the orientation control film 3 falls below the above range, flux reversal is likely to occur and the thermal decay deteriorate. In addition, when $\Delta\theta50$ exceeds the above range, the output characteristics and the noise characteristics deteriorate.

The difference ($\Delta\theta50$ (mag)–$\Delta\theta50$ (ori)) between $\Delta\theta50$ (ori) of the orientation control film and $\Delta\theta50$ (mag) of the perpendicular magnetization film 4 is set 1 to 8 degrees (preferably from 2 to 6 degrees).

When $\Delta\theta50$ (mag)–$\Delta\theta50$ (ori) falls below the above range, the noise characteristics deteriorate. In addition, when it exceeds the above range, the thermal decay deteriorate.

The negative nucleation field (–Hn) of the perpendicular magnetization film 4 is preferably equal to or higher than 0(Oe).

When the negative nucleation field (–Hn) falls below the above range, the thermal stability deteriorates.

In the magnetic recording medium of the present embodiment, since the orientation control film 3 has an fcc structure and, at the same time, $\Delta\theta50$ of the (111) orientation plane is set within a range from 3 to 10 degrees and the difference in $\Delta\theta50$ is set within a range from 1 to 8 degrees, as described above, the magnetic characteristics (output characteristics, noise characteristics, magnetic read/write characteristics and the like) can be improved and, moreover, deterioration of the thermal decay can be prevented.

Therefore, high-density recording becomes possible.

Figure 7:
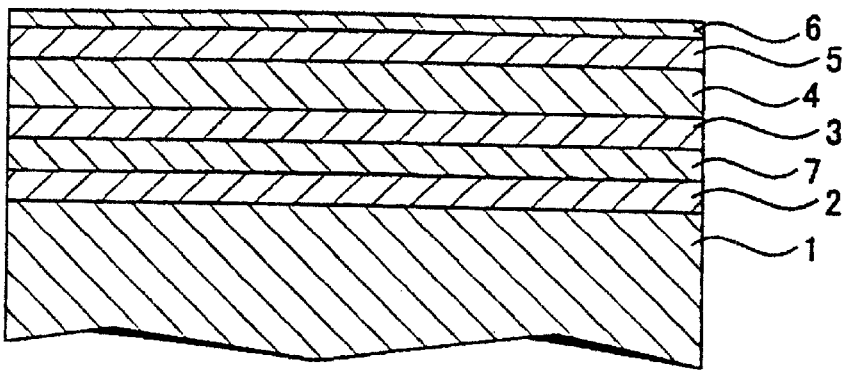
FIG. 7 is a partially sectional view showing the third embodiment of a magnetic recording medium of the present invention.

FIG. 7 shows the third embodiment of the magnetic recording medium of the present invention. This magnetic recording medium is different from the first embodiment of the magnetic recording medium in that an orientation control undercoat film 7 is provided between a soft magnetic undercoat film 2 and an orientation control film 3.

As the orientation control undercoat film 7, a material containing, as the major constituent, one or more kinds of Ti, Zn, Y, Zr, Ru, Re, Gd, Tb and Hf can be used.

As the material of the orientation control undercoat film 7, a material having a B2 structure can also be used.

As the material having a B2 structure, a material containing, as the major constituent, one or more kinds of alloys such as NiAl, FeAl, CoFe, CoZr, NiTi, AlCo, AlRu and CoTi.

It is also possible to use materials prepared by adding elements such as Cr, Mo, Si, Mn, W, Nb, Ti, Zr, B, O and N to these alloys.

The thickness of the orientation control undercoat film 7 is preferably equal to or lower than 30 nm. When the thickness exceeds the above range, since the distance between the perpendicular magnetization film 4 and the soft magnetic undercoat film 2 increases, the resolution and noise characteristics deteriorate. The thickness of the orientation control undercoat film 7 is preferably equal to or higher than 0.1 nm.

Figure 8:
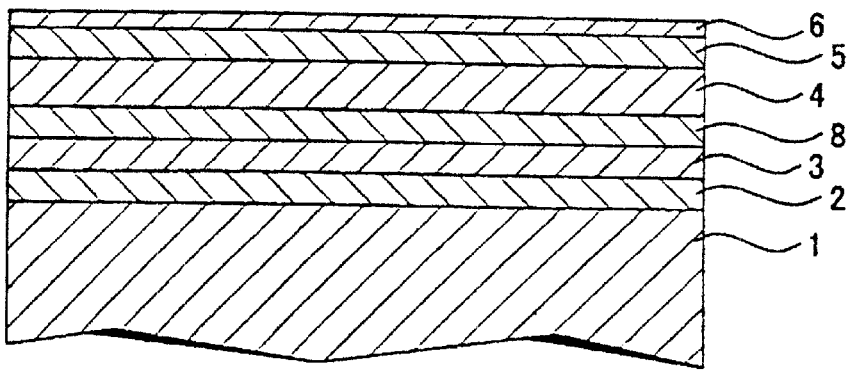
FIG. 8 is a partially sectional view showing the fourth embodiment of a magnetic recording medium of the present invention.

FIG. 8 shows the fourth embodiment of the magnetic recording medium of the present invention. This magnetic recording medium is different from the first embodiment of the magnetic recording medium in that a non-magnetic intermediate film 8 made of a non-magnetic material is provided between an orientation control film 3 and a perpendicular magnetization film 4.

In the non-magnetic intermediate film 8, a Co alloy can be used.

As the Co alloy, CoCr can be used. It is also possible to use alloys prepared by adding one or more kinds of elements selected from Ta, Zr, Nb, Cu, Re, Ru, Ni, Mn, Ge, Si, O, N and B to CoCr.

It is also possible to use non-magnetic Co alloys containing one or more kinds of elements selected from Ta, Zr, Nb, Cu, Re, Ru, Ni, Mn, Ge, Si, O, N and B and Co.

The Co content in the Co is preferably within a range from 40 to 70 at %. When the content falls below the above range, the effect of improving crystal orientation of the perpendicular magnetization film 4 becomes insufficient. In addition, when the content exceeds the above range, the non-magnetic intermediate film 8 is likely to be magnetized and the magnetic characteristics of the magnetic recording medium deteriorate.

When the non-magnetic intermediate film 8 is too thick, since the distance between the perpendicular magnetization film 4 and the soft magnetic undercoat film 2 increases, the resolution decreases and the noise characteristics deteriorate. Therefore, the thickness is preferably equal to or less than 20 nm, and more preferably equal to or less than 10 nm.

By providing the non-magnetic intermediate film 8, the orientation of the perpendicular magnetization film 4 is improved and the coercive forces increases, thus making it possible to obtain excellent output characteristics.

Figure 9:
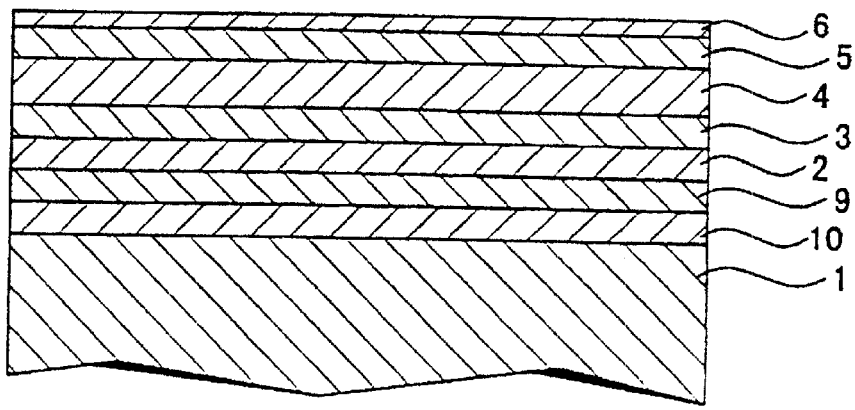
FIG. 9 is a partially sectional view showing the fifth embodiment of a magnetic recording medium of the present invention.

FIG. 9 shows the fifth embodiment of the magnetic recording medium of the present invention. This magnetic recording medium is different from the first embodiment of the magnetic recording medium in that an in-plane soft magnetic film 9 made of a hard magnetic material having magnetic anisotropy and an in-plane undercoat film 10 are provided between a non-magnetic substrate 1 and a soft magnetic undercoat film 2.

The material used in the in-plane soft magnetic film 9 is made of a CoCr alloy, particularly a material containing, as the major constituent, CoCrPtX (X denotes one or more kinds selected from B, Ta, Cu, Zr, Nb, Re, Ni, Mn, Ge, Si, O and N).

As CoCrPtX, CoCrPtB, CoCrPtTa and CoCrPtBCu are preferably used.

Examples of materials of the in-plane soft magnetic film 9 are magnetic materials made of an alloy comprising a transition metal and rare earth elements, for example, CoSm alloy and CoPr alloy.

The in-plane soft magnetic film 9 preferably has a coercive force Hc equal to or higher than 500(Oe) (more preferably equal to or higher than 1000(Oe)).

The thickness of the in-plane soft magnetic film 9 is preferably within a range from 20 to 150 nm (more preferably from 40 to 70 nm).

The in-plane soft magnetic film 9 is preferably magnetized in the radial direction from the center of the substrate and exchange coupling between the hard magnetic film and the soft magnetic undercoat film 2 is preferably formed so that the soft magnetic undercoat film 2 does not form a magnetic wall in the radial direction of the substrate.

The in-plane undercoat film 10 is provided right below the hard magnetic film 9 and examples of the material include Cr or Cr alloy.

Examples of the Cr alloy used in the in-plane undercoat film 10 include CrMo alloy, CrTi alloy, CrW alloy, CrMo alloy, CrV alloy, CrSi alloy and CrNb alloy.

By providing the in-plane soft magnetic film 9, the occurrence of spike noise due to extremely large magnetic domains formed by the soft magnetic undercoat film 2 is prevented, thus making it possible to obtain a magnetic recording medium which is superior in error rate characteristics and is capable of high-density recording. This reason is as follows.

Since the soft magnetic undercoat film 2 has a small coercive force and an easily changeable direction of magnetization, extremely large magnetic domains are formed in the in-plane direction of the substrate 1. The magnetic wall at the boundary of the magnetic domain in the soft magnetic undercoat film 2 is a cause of the occurrence of spike noise, resulting in a decrease in error rate of the magnetic recording medium.

By providing the in-plane hard magnetic film 9 between the soft magnetic undercoat film 2 and the substrate 1, the magnetic direction of the soft magnetic undercoat film 2 is forced to face the radial direction of the substrate 1 by the magnetic exchange coupling between the hard magnetic film 9 and the soft magnetic undercoat film 2, thus making it possible to prevent formation of extremely large magnetic domains. Therefore, the occurrence of spike noise can be prevented.

Figure 10:
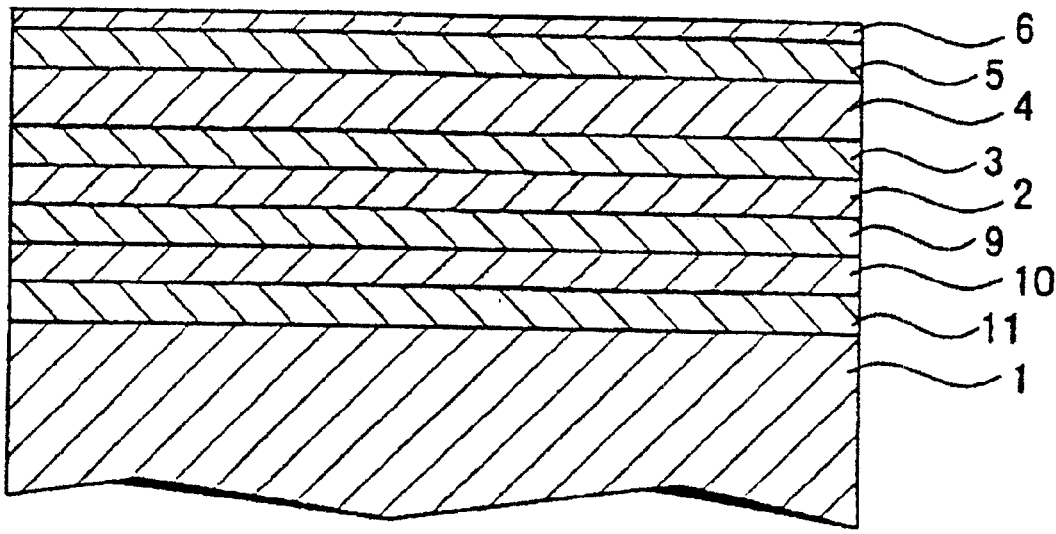
FIG. 10 is a partially sectional view showing the sixth embodiment of a magnetic recording medium of the present invention.

FIG. 10 shows the sixth embodiment of the magnetic recording medium of the present invention. This magnetic recording medium differs from the magnetic recording medium shown in FIG. 9 in that a seed film 11 is provided between a non-magnetic substrate 1 and an in-plane undercoat film 10.

The seed film 11 is formed to enhance the crystal orientation of the in-plane undercoat film 10 formed right above it and to make crystal grains fine. As the material thereof, a material containing, as the major constituent, one or more kinds of NiAl, FeAl, CoFe, CoZr, NiTi, AlCo, AlRu and CoTi can be used.

In the present embodiment, by providing the seed film 11, the crystal orientation of the in-plane hard magnetic film 9 can be increased and the magnetic anisotropy can be improved and, moreover, the medium noise can be further suppressed.

Figure 11:
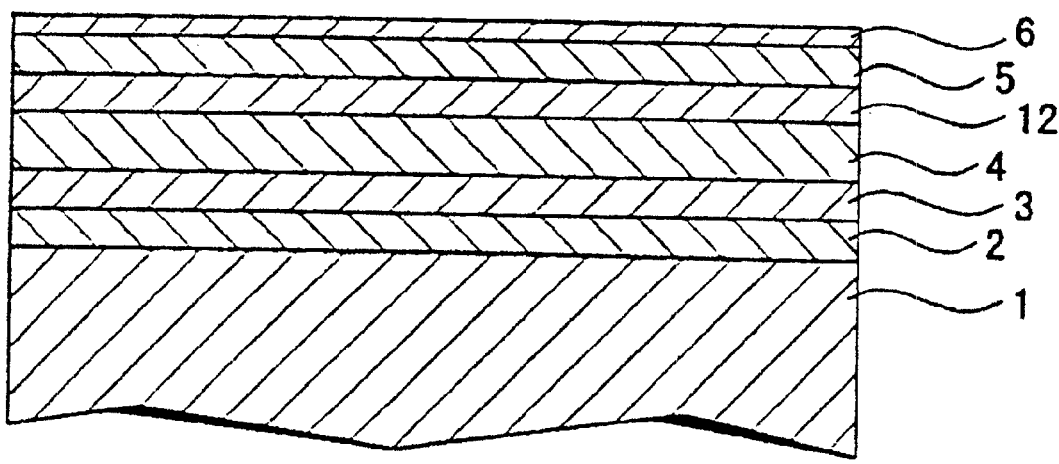
FIG. 11 is a partially sectional view showing the seventh embodiment of a magnetic recording medium of the present invention.

FIG. 11 shows the seventh embodiment of the magnetic recording medium of the present invention. This magnetic recording medium differs from the magnetic recording medium shown in FIG. 1 in that a magnetizing stabilization film 12 is provided between a perpendicular magnetization film 4 and a protective film 5.

As the material of the magnetizing stabilization film 12, materials listed as the material, that can be used in the soft magnetic undercoat film 2, can be used.

The coercive force Hc of the magnetizing stabilization film 12 is preferably equal to or lower than 200(Oe) (preferably equal to or lower than 50(Oe)).

The saturation magnetic flux density Bs of the magnetizing stabilization film 12 is preferably equal to or higher than 0.4 T (preferably equal to or higher than 1 T).

Also Bs·t, that is, the product of the saturation magnetic density and the film thickness, of the magnetizing stabilization film 12, is preferably equal to or less than 7.2 T·nm. When Bs·t exceeds the above range, the replay output decreases.

The magnetizing stabilization film 12 can have a construction in which the constituent material in the surface is partially or completely oxidized in the surface of the magnetizing stabilization film 12 (the plane of the protective film 5 or the perpendicular magnetic film 4 side) and the proximity thereof (a region which is a predetermined depth from the surface).

In the present embodiment, by providing the magnetizing stabilization film 12, the fluctuation of the magnetization in the surface of the perpendicular magnetic film 4 can be suppressed.

Therefore, the leakage flux is not influenced by this fluctuation, and the replay output is increased.

In addition, by providing the magnetizing stabilization film 12, the magnetization of the perpendicular magnetic film 4 in the perpendicular direction and the magnetization of the soft magnetic undercoat film 2 and the magnetizing stabilization film 12 in the in-plane direction form a closed circuit. Due to this action, the thermal stability increases because the magnetization of the perpendicular magnetic film 4 is established more strongly in the perpendicular direction.

In addition, in the case of a structure in which that the surface of the magnetizing stabilization film 12 is oxidized, the magnetic fluctuation of the surface of the magnetizing stabilization film 12 can be suppressed, and thereby the noise that originates in this magnetic fluctuation can be reduced, and the replay characteristics of the magnetic recording medium can be improved.

Figure 12:
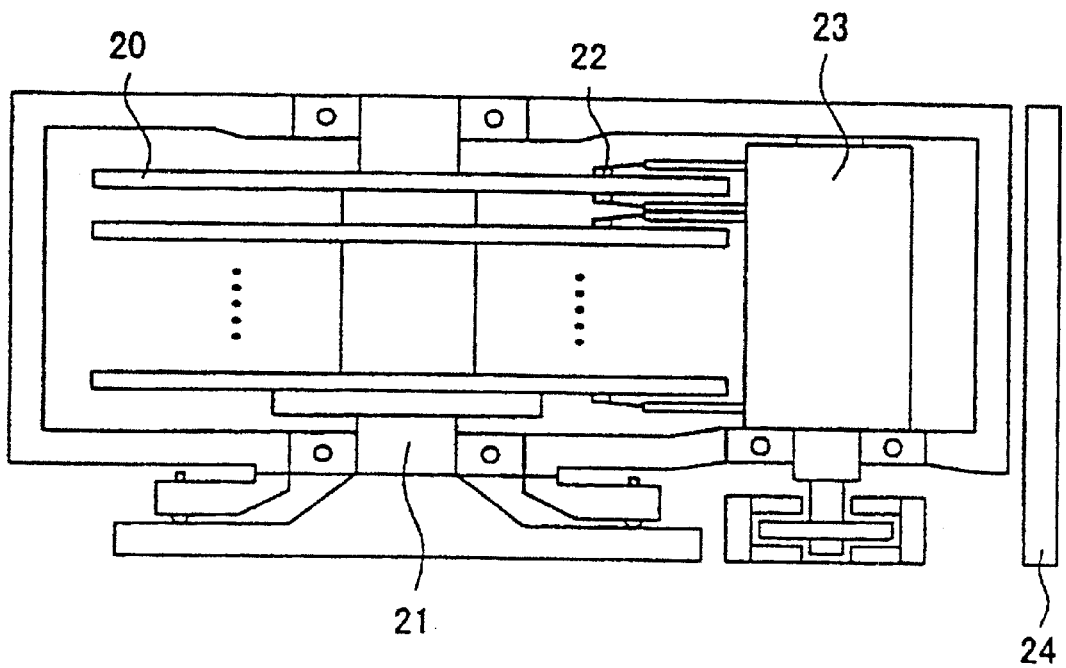
FIG. 12 is a schematic structural view showing an example of a magnetic read/write apparatus of the present invention.

FIG. 12 is a sectional structural view showing an example of the magnetic read/write apparatus according to the present invention.

The magnetic read/write apparatus shown in this drawing comprises a magnetic recording medium 20 having the construction described above, a medium drive unit 21 that rotates this magnetic recording medium 20, a magnetic head 22 that carries out recording and replay of the information on the magnetic recording medium 20, a head drive unit 23 that drives the magnetic head 22, and a read/write signal processing system 24.

The replay signal processing system 24 sends a recorded signal to the magnetic head 22 after processing the input data, and outputs the data after processing the replay signal from the magnetic head 22.

A single pole type head can be used as the magnetic head 22.

Figure 13:
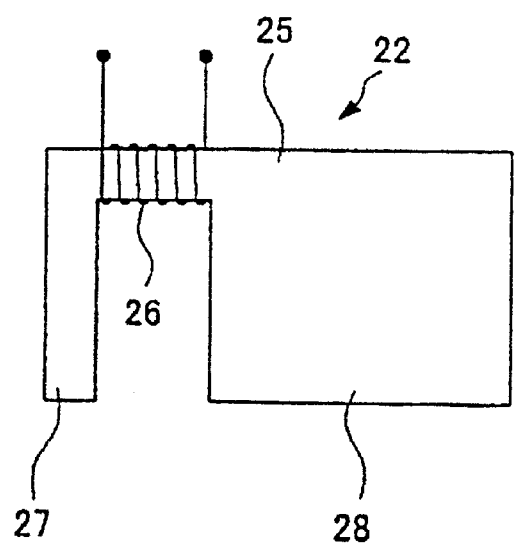
FIG. 13 is a structural view showing an example of a magnetic head used in the magnetic read/write apparatus shown in FIG. 12.

FIG. 13 is a drawing showing an example of a single pole type head. The single pole type head 22 has a simplified structure comprising a magnetic pole 25 and a coil 26. The magnetic pole 25 is approximately C-shaped when viewed from the side, and has a main magnetic pole 27 having a narrow width and an auxiliary magnetic pole 28 having a wide width. The main magnetic pole 27 generates a magnetic field that is applied to the perpendicular magnetic film 4 during recording, and can detect a magnetic flux from the perpendicular magnetic film 4 during replay.

When carrying out recording on the magnetic recording medium 20 using a single pole type head 22, the magnetic flux issuing from the distal end of the main magnetic pole 27 magnetizes the perpendicular magnetic film 4 in the direction perpendicular to the substrate 1.

At this time, because the soft magnetic undercoat film 2 is provided in the magnetic recording medium 20, the magnetic flux from the main magnetic pole 27 of the single pole type head 22 is guided to the auxiliary magnetic pole 28 by passing through the perpendicular magnetic film 4 and the soft magnetic undercoat film 2, thereby forming a closed magnetic circuit.

By this closed magnetic circuit being formed between the single pole type head 22 and the magnetic recording medium 20, the efficiency of the flow of the magnetic flux increases, and high-density read/write becomes possible.

Although the direction of the magnetic flux between the soft magnetic undercoat film 2 and the auxiliary magnetic pole 28 is opposite to the direction of the magnetic flux between the main magnetic pole 27 and the soft magnetic undercoat film 2, the auxiliary magnetic pole 28 has a wide area as compared with the main magnetic pole 27. Therefore, the magnetic reflux from the auxiliary magnetic pole 28 sufficiently decreases, and thus the magnetization of the perpendicular magnetic film 4 is not influenced by the magnetic reflux from the auxiliary magnetic pole 28.

In the present invention, besides a single pole type head, for example, a laminated thin film magnetic recording head providing a giant magnetoresistance (GMR) element can be used in the replay unit.

In the magnetic recording medium 20 of the present embodiment, since the orientation control film 3 has an fcc structure and, at the same time, $\Delta\theta 50$ of the (0002) or (111) orientation plane is set within a range from 3 to 10 degrees and the difference in $\Delta\theta 50$ is set within a range from 1 to 8 degrees, as described above, the magnetic characteristics (output characteristics, noise characteristics, magnetic read/write characteristics and the like) can be improved and, moreover, deterioration of the thermal decay can be prevented.

Therefore, high-density recording becomes possible.

EXAMPLES

The operational effect of the present invention will now be clarified by way of examples.

Example 1

A washed glass substrate 1 (Ohara Co.; diameter: 2.5 inches) was accommodated in the film formation chamber of a DC magnetron sputtering apparatus (Aneruva Corp., C-3010), and after expelling air in the film formation chamber up to a maximum vacuum of $1\times10^{-5}$ Pa, a soft magnetic undercoat film 2 (thickness: 150 nm) made of 92Co4Ta4Zr was formed on the glass substrate 1.

On the soft magnetic undercoat film 2, an orientation control film 3 (thickness: 20 nm) made of Ru and a perpendicular magnetization film 4 (thickness: 25 nm) made of 65Co17Cr16Pt2B were then formed.

During the formation of the film described above, argon was used as a process gas, and the gas pressure was set at 0.5 Pa. In addition, the temperature condition during film formation was 200° C.

Then, the protective film 5 made of carbon was formed on the perpendicular magnetization film 4 using a CVD method. Then, the lubrication film 6 made of perfluoropolyether was formed using a deep coating method to obtain a magnetic recording medium (see Table 1).

Moreover, in the above description of the alloy material, aAbB indicates a(at %)A-b(at %)B. For example, 65Co17Cr16Pt2B denotes 65 at % Co-17 at % Cr-16 at % Pt-2 at % B (a Co content of 65 at %, a Cr content of 17 at %, a Pt content of 16 at %, and a B content of 2 at %).

Examples 2 to 5

During the formation of the orientation control film 3 and the perpendicular magnetization film 4, $\Delta\theta 50$ was changed by controlling the temperature, the process gas pressure, the film-forming rate, and the distance between a target and a substrate to produce magnetic recording media. Other conditions were decided according to Example 1 (see Table 1).

Examples 6 and 7

Magnetic recording media were produced by selecting the material and thickness of the orientation control film 3 as shown in Table 1. Other conditions were decided according to Example 1 (see Table 1).

Examples 8 and 9

An orientation control undercoat film 7 was provided between the soft magnetic undercoat film 2 and the orientation control film 3 to produce magnetic recording media. Other conditions were decided according to Example 1 (see Table 1).

Examples 10 to 14

Magnetic recording media were produced by selecting the material and thickness of the orientation control film 3 as shown in Table 1. Other conditions were decided according to Example 1 (see Table 1).

Comparative Examples 1 to 3

Magnetic recording media were produced by selecting the material and thickness of the orientation control film 3 as shown in Table 1. Other conditions were decided according to Example 1 (see Table 1).

Examples 15 to 17

Magnetic recording media were produced by selecting the material and thickness of the orientation control film 3 as shown in Table 2. Other conditions were decided according to Example 1 (see Table 2).

Example 18

The orientation control undercoat film 7 was provided between the soft magnetic undercoat film 2 and the orientation control film 3 to produce a magnetic recording medium. Ni was used as the material of the orientation control film 3. Other conditions were decided according to Example 15 (see Table 2).

Examples 19 to 21

Magnetic recording media were produced by selecting the material and thickness of the orientation control film 3 as shown in Table 2. Other conditions were decided according to Example 15 (see Table 2).

Comparative Examples 4 and 5

During the formation of the orientation control film 3 and the perpendicular magnetization film 4, $\Delta\theta 50$ was changed by controlling the temperature, the process gas pressure, the film-forming rate, and the distance between a target and a substrate to produce magnetic recording media. Other conditions were decided according to Example 15 (see Table 2).

Examples 22 to 25

During the formation of the orientation control film 3 and the perpendicular magnetization film 4, $\Delta\theta 50$ was changed by controlling the temperature, the process gas pressure, the film-forming rate, and the distance between a target and a substrate to produce magnetic recording media. Other conditions were decided according to Example 15 (see Table 3).

Examples 26 to 33

Magnetic recording media were produced by selecting the material and thickness of the soft magnetic undercoat film 2 as shown in Table 4. Other conditions were decided according to Example 1 (see Table 4).

Examples 34 to 37

A seed film 11, an in-plane undercoat film 10 and an in-plane soft magnetic film 9 were provided between a non-magnetic substrate 1 and the soft magnetic undercoat film 2 and then the material shown in Table 5 was used as the material of the soft magnetic undercoat film 2 to produce magnetic recording media. Other conditions were decided according to Example 1 (see Table 5).

Example 38

The in-plane undercoat film 10 and the in-plane soft magnetic film 9 were provided between the non-magnetic substrate 1 and the soft magnetic undercoat film 2 to produce a magnetic recording medium. Other conditions were decided according to Example 1 (see Table 5).

Examples 39 to 46

Magnetic recording media were produced by selecting the material and thickness of the perpendicular magnetization film 4 as shown in Table 6. Other conditions were decided according to Example 1 (see Table 6).

Examples 47 to 50

Magnetic recording media were produced according to the same manner as in Example 1, except that the soft magnetic undercoat film 2 is subjected to an oxidation treatment by exposing the surface of the soft magnetic undercoat film 2 to an oxygen-containing gas (exposure gas). As the exposure gas, pure oxygen (100% $O_2$) or an oxygen-argon mixed gas (mixing ratio: 50 vol % $O_2$-50 vol % Ar) was used.

The construction of these magnetic recording media and the thickness of the oxidized layer formed on the surface of the soft magnetic undercoat film 2 are shown in Table 7.

Example 51

A magnetic recording medium was produced according to the same manner as in Example 1, except that Ar (100%) was used as the process gas (film-forming gas) and then an oxygen-argon mixed gas (mixing ratio: 10 vol % $O_2$-90 vol % Ar) was used in the case of forming the soft magnetic undercoat film 2 (see Table 7).

The oxidized layer was formed in proximity of the surface of the soft magnetic undercoat film 2 by using the oxygen-argon mixed gas. The thickness of this oxidized layer is also shown in Table 7.

Examples 52 to 59

Magnetic recording media were produced according to the same manner as in Example 1, except that a non-magnetic intermediate film 8 was used (see Table 8).

Examples 60 to 64

Magnetic recording media were produced according to the same manner as in Example 1, except that a magnetizing stabilization film 12 (see Table 9).

$\Delta\theta 50$ of the orientation control film 3 and the perpendicular magnetization film 4 of the respective magnetic recording media was measured by an X-ray diffraction method. This $\Delta\theta 50$ was measured with respect to the (0002) orientation plane for the film made of the material having an hcp structure, while $\Delta\theta 50$ was measured with respect to the (111) orientation plane for the film made of the material having an fcc structure.

Also magnetic characteristics of the respective magnetic recording media were measured using a read light analyzer RWA1632 manufactured by GUZIK Co., a spin stand S1701MP, a vibration-type magnetic characteristics measuring apparatus (VSM) and a Kerr effect measuring apparatus.

In the evaluation of magnetic characteristics, a single magnetic pole head was used as a magnetic head and the measurement was conducted at a track recording density of 600 kFCI (during replay).

The evaluation of the thermal stability was made by calculating the decrease rate (%/decade) of the output of the replay output after writing at a track recording density of 50 kFCI after heating the substrate to 70° C. one second after writing based on $(So-S)\times100/(So\times3)$. In this equation, So denotes the replay output when one second has passed after the signal recording onto the magnetic recording medium, and S denotes the replay output after 1000 seconds.

The test results are shown in Tables 1 to 9.

TABLE 1

| | SOFT MAGNETIC UNDERCOAT FILM | | | ORIENTATION CONTROL UNDERCOAT FILM | | ORIENTATION CONTROL FILM | | |
|---|---|---|---|---|---|---|---|---|
| | COMPOSITION | THICK-NESS | Bs (T) | COMPOSITION | THICK-NESS | COMPOSITION | THICK-NESS | CRYSTAL STRUCTURE |
| EXAMPLE 1 | 92Co4Ta4Zr | 150 | 1.3 | — | — | Ru | 20 | hcp |
| EXAMPLE 2 | 92Co4Ta4Zr | 150 | 1.3 | — | — | Ru | 20 | hcp |
| EXAMPLE 3 | 92Co4Ta4Zr | 150 | 1.3 | — | — | Ru | 20 | hcp |
| EXAMPLE 4 | 92Co4Ta4Zr | 150 | 1.3 | — | — | Ru | 20 | hcp |
| EXAMPLE 5 | 92Co4Ta4Zr | 150 | 1.3 | — | — | Ru | 20 | hcp |
| EXAMPLE 6 | 92Co4Ta4Zr | 150 | 1.3 | — | — | 70Ru30Cr | 20 | hcp |
| EXAMPLE 7 | 92Co4Ta4Zr | 150 | 1.3 | — | — | Re | 20 | hcp |
| EXAMPLE 8 | 92Co4Ta4Zr | 150 | 1.3 | NiAl | 8 | Ru | 20 | hcp |
| EXAMPLE 9 | 92Co4Ta4Zr | 150 | 1.3 | Ti(*1 | 20 | Ru | 20 | hcp |
| EXAMPLE 10 | 92Co4Ta4Zr | 150 | 1.3 | — | — | 25Ag75Ge | 25 | hcp |
| EXAMPLE 11 | 92Co4Ta4Zr | 150 | 1.3 | — | — | 50Cu50Ge | 25 | hcp |
| EXAMPLE 12 | 92Co4Ta4Zr | 150 | 1.3 | — | — | 75Ru25Nb | 25 | hcp |
| EXAMPLE 13 | 92Co4Ta4Zr | 150 | 1.3 | — | — | 70Ru—30($SiO_2$) | 25 | hcp |
| EXAMPLE 14 | 92Co4Ta4Zr | 150 | 1.3 | — | — | 80Re—20($Al_2O_3$) | 25 | hcp |
| COMPARATIVE EXAMPLE 1 | 92Co4Ta4Zr | 150 | 1.3 | — | — | Re | 30 | hcp |
| COMPARATIVE EXAMPLE 2 | 92Co4Ta4Zr | 150 | 1.3 | — | — | 25Ag75Ge | 25 | hcp |
| COMPARATIVE EXAMPLE 3 | 92Co4Ta4Zr | 150 | 1.3 | — | — | Ti | 30 | hcp |

| | PERPENDICULAR MAGNETIZATION FILM | Δθ50 (ori) (degree) | Δθ50 (mag) (degree) | DIFFERENCE IN Δθ50(*2 (degree) | READ/WRITE CHARACTERISTICS ERROR RATE $10^x$ | THERMAL STABILITY (%/decade) |
|---|---|---|---|---|---|---|
| EXAMPLE 1 | (*3 | 6.6 | 8.8 | 2.2 | −6.1 | 0.65 |
| EXAMPLE 2 | (*3 | 3.4 | 6.9 | 3.5 | −6.1 | 0.57 |
| EXAMPLE 3 | (*3 | 9.2 | 11.6 | 2.4 | −6.4 | 0.78 |
| EXAMPLE 4 | (*3 | 8.0 | 9.2 | 1.2 | −6.0 | 0.58 |
| EXAMPLE 5 | (*3 | 5.2 | 12.8 | 7.6 | −6.1 | 0.91 |
| EXAMPLE 6 | (*3 | 5.4 | 8.9 | 3.5 | −6.2 | 0.70 |
| EXAMPLE 7 | (*3 | 4.7 | 5.2 | 0.5 | −5.7 | 0.62 |
| EXAMPLE 8 | (*3 | 8.9 | 11.5 | 2.6 | −6.3 | 0.78 |
| EXAMPLE 9 | (*3 | 5.8 | 7.2 | 1.4 | −6.1 | 0.55 |
| EXAMPLE 10 | (*3 | 7.2 | 9.8 | 2.6 | −6.3 | 0.80 |
| EXAMPLE 11 | (*3 | 5.8 | 9.9 | 4.1 | −6.0 | 0.60 |
| EXAMPLE 12 | (*3 | 6.7 | 7.9 | 1.2 | −5.8 | 0.50 |
| EXAMPLE 13 | (*3 | 6.8 | 9.9 | 3.1 | −6.2 | 0.76 |
| EXAMPLE 14 | (*3 | 7.5 | 8.9 | 1.4 | −5.9 | 0.65 |
| COMPARATIVE EXAMPLE 1 | (*3 | 10.8 | 14.6 | 3.8 | −5.9 | 1.36 |
| COMPARATIVE EXAMPLE 2 | (*3 | 7.8 | 7.9 | 0.1 | −5.2 | 0.54 |
| COMPARATIVE EXAMPLE 3 | (*3 | 2.4 | 3.6 | 1.2 | −4.8 | 0.50 |

(Thickness unit: nm)
(*1 Δθ50 of orientation control undercoat film is 4.1 degrees
(*2 Difference in Δθ50; Δθ50 (mag) - Δθ50 (ori))
(*3 Composition; 65Co17Cr16Pt2B, thickness; 25 nm

TABLE 2

| | SOFT MAGNETIC UNDERCOAT FILM | | | ORIENTATION CONTROL UNDERCOAT FILM | | ORIENTATION CONTROL FILM | | |
|---|---|---|---|---|---|---|---|---|
| | COMPOSITION | THICK-NESS | Bs (T) | COMPOSITION | THICK-NESS | COMPOSITION | THICK-NESS | CRYSTAL STRUCTURE |
| EXAMPLE 15 | 92Co4Ta4Zr | 150 | 1.3 | — | — | 80Ni20Cr | 20 | fcc |
| EXAMPLE 16 | 92Co4Ta4Zr | 150 | 1.3 | — | — | 80Ni20Cr | 20 | fcc |
| EXAMPLE 17 | 92Co4Ta4Zr | 150 | 1.3 | — | — | 80Ni20Cr | 20 | fcc |
| EXAMPLE 18 | 92Co4Ta4Zr | 150 | 1.3 | NiAl | 8 | Ni | 20 | fcc |
| EXAMPLE 19 | 92Co4Ta4Zr | 150 | 1.3 | — | — | 70Au—30($SiO_2$) | 20 | fcc |
| EXAMPLE 20 | 92Co4Ta4Zr | 150 | 1.3 | — | — | Cu | 20 | fcc |
| EXAMPLE 21 | 92Co4Ta4Zr | 150 | 1.3 | — | — | 80Pd20B | 20 | fcc |

TABLE 2-continued

| | | | | | | | | |
|---|---|---|---|---|---|---|---|---|
| COMPARATIVE EXAMPLE 4 | 92Co4Ta4Zr | 150 | 1.3 | — | — | 80Ni20Cr | 25 | fcc |
| COMPARATIVE EXAMPLE 5 | 92Co4Ta4Zr | 150 | 1.3 | — | — | 80Ni20Cr | 30 | fcc |

| | PERPENDICULAR MAGNETIZATION FILM | Δθ50 (ori) (degree) | Δθ50 (mag) (degree) | DIFFERENCE IN Δθ50 (degree) | READ/WRITE CHARACTERISTICS ERROR RATE $10^x$ | THERMAL STABILITY (%/decade) |
|---|---|---|---|---|---|---|
| EXAMPLE 15 | (*1) | 6.8 | 9.7 | 2.9 | −5.8 | 0.69 |
| EXAMPLE 16 | (*1) | 3.5 | 10 | 6.5 | −5.8 | 0.72 |
| EXAMPLE 17 | (*1) | 6.0 | 7.4 | 1.4 | −5.7 | 0.74 |
| EXAMPLE 18 | (*1) | 7.5 | 10.3 | 2.8 | −6.1 | 0.69 |
| EXAMPLE 19 | (*1) | 6.1 | 9.7 | 3.6 | −6.3 | 0.66 |
| EXAMPLE 20 | (*1) | 5.2 | 9.9 | 4.7 | −5.8 | 0.62 |
| EXAMPLE 21 | (*1) | 9.5 | 15.1 | 5.6 | −5.9 | 0.71 |
| COMPARATIVE EXAMPLE 4 | (*1) | 10.6 | 13.2 | 2.6 | −5.9 | 1.36 |
| COMPARATIVE EXAMPLE 5 | (*1) | 2.8 | 3.8 | 1.0 | −4.1 | 0.69 |

(Thickness unit: nm)
(*1 Composition; 65Co17Cr16Pt2B, thickness; 25 nm)

TABLE 3

| | SOFT MAGNETIC UNDERCOAT FILM | | | ORIENTATION CONTROL FILM | | | PERPENDICULAR MAGNETIZATION FILM | |
|---|---|---|---|---|---|---|---|---|
| | COMPOSITION | THICKNESS | Bs (T) | COMPOSITION | THICKNESS | CRYSTAL STRUCTURE | COMPOSITION | THICKNESS |
| EXAMPLE 1 | 92Co4Ta4Zr | 150 | 1.3 | 80Ni20Cr | 20 | fcc | 65Co17Cr16Pt2B | 25 |
| EXAMPLE 22 | 92Co4Ta4Zr | 150 | 1.3 | 80Ni20Cr | 20 | fcc | 65Co17Cr16Pt2B | 25 |
| EXAMPLE 23 | 92Co4Ta4Zr | 150 | 1.3 | 80Ni20Cr | 20 | fcc | 65Co17Cr16Pt2B | 25 |
| EXAMPLE 24 | 92Co4Ta4Zr | 150 | 1.3 | 80Ni20Cr | 20 | fcc | 65Co17Cr16Pt2B | 25 |
| EXAMPLE 25 | 92Co4Ta4Zr | 150 | 1.3 | 80Ni20Cr | 20 | fcc | 65Co17Cr16Pt2B | 35 |

| | Δθ50 (ori) (degree) | Δθ50 (mag) (degree) | DIFFERENCE IN Δθ50 (degree) | READ/WRITE CHARACTERISTICS ERROR RATE $10^{-X}$ | THERMAL STABILITY (%/decade) |
|---|---|---|---|---|---|
| EXAMPLE 1 | 6.6 | 8.8 | 2.2 | −6.1 | 0.65 |
| EXAMPLE 22 | 7.4 | 5.8 | −1.6 | −5.7 | 0.72 |
| EXAMPLE 23 | 7.3 | 4.6 | −2.7 | −4.3 | 0.47 |
| EXAMPLE 24 | 7.1 | 14.5 | 7.4 | −6.1 | 0.92 |
| EXAMPLE 25 | 6.8 | 16.8 | 10 | −5.8 | 1.62 |

(Thickness unit: nm)

TABLE 4

| | SOFT MAGNETIC UNDERCOAT FILM | | | ORIENTATION CONTROL FILM | | | PERPENDICULAR MAGNETIZATION FILM | |
|---|---|---|---|---|---|---|---|---|
| | COMPOSITION | THICKNESS | Bs (T) | COMPOSITION | THICKNESS | CRYSTAL STRUCTURE | COMPOSITION | THICKNESS |
| EXAMPLE 1 | 92Co4Ta4Zr | 150 | 1.3 | Ru | 20 | hcp | 65Co17Cr16Pt2B | 25 |
| EXAMPLE 26 | 88Co4Ta8Zr | 150 | 1.3 | Ru | 20 | hcp | 65Co17Cr16Pt2B | 25 |
| EXAMPLE 27 | 85Co7Ta8Zr | 150 | 1.3 | Ru | 20 | hcp | 65Co17Cr16Pt2B | 25 |
| EXAMPLE 28 | 92Co4Ta4Zr | 20 | 1.3 | Ru | 20 | hcp | 65Co17Cr16Pt2B | 25 |
| EXAMPLE 29 | 92Co4Ta4Zr | 40 | 1.3 | Ru | 20 | hcp | 65Co17Cr16Pt2B | 25 |
| EXAMPLE 30 | 92Co4Ta4Zr | 400 | 1.3 | Ru | 20 | hcp | 65Co17Cr16Pt2B | 25 |
| EXAMPLE 31 | 80Fe10Ta10C | 150 | 1.6 | Ru | 20 | hcp | 65Co17Cr16Pt2B | 25 |
| EXAMPLE 32 | 82Fe6Zr12N | 150 | 1.7 | Ru | 20 | hcp | 65Co17Cr16Pt2B | 25 |
| EXAMPLE 33 | 78Fe22(Al2O3) | 150 | 1.4 | Ru | 20 | hcp | 65Co17Cr16Pt2B | 35 |

| | Δθ50 (ori) (degree) | Δθ50 (mag) (degree) | DIFFERENCE IN Δθ50 (degree) | READ/WRITE CHARACTERISTICS ERROR RATE $10^x$ |
|---|---|---|---|---|
| EXAMPLE 1 | 6.6 | 8.8 | 2.2 | −6.1 |
| EXAMPLE 26 | 5.5 | 8.1 | 2.6 | −6.1 |

TABLE 4-continued

| | | | | |
|---|---|---|---|---|
| EXAMPLE 27 | 5.6 | 8.3 | 2.7 | −5.9 |
| EXAMPLE 28 | 5.9 | 8.9 | 3.0 | −4.2 |
| EXAMPLE 29 | 6.3 | 8.3 | 2.0 | −5.8 |
| EXAMPLE 30 | 6.2 | 8.4 | 2.2 | −6.1 |
| EXAMPLE 31 | 5.5 | 8.1 | 2.6 | −6.1 |
| EXAMPLE 32 | 5.6 | 8.5 | 2.9 | −6.3 |
| EXAMPLE 33 | 5.7 | 8.3 | 2.6 | −6.2 |

(Thickness unit: nm)

TABLE 5

| | SEED FILM | | IN-PLANE HARD MAGNETIC FILM | | SOFT MAGNETIC UNDERCOAT FILM | | ORIENTATION CONTROL FILM | | |
|---|---|---|---|---|---|---|---|---|---|
| | COMPOSITION | THICKNESS | COMPOSITION | THICKNESS | COMPOSITION | THICKNESS | COMPOSITION | THICKNESS | Bs (T) |
| EXAMPLE 1 | — | — | — | — | — | — | 92Co4Ta4Zr | 150 | 1.3 |
| EXAMPLE 34 | NiAl | 50 | CrMo | 15 | Co22Cr12Pt5B | 50 | 88Co4Ta8Zr | 150 | 1.3 |
| EXAMPLE 35 | NiAl | 50 | CrMo | 15 | Co22Cr12Pt5B | 20 | 85Co7Ta8Zr | 150 | 1.3 |
| EXAMPLE 36 | NiAl | 50 | CrMo | 15 | Co22Cr12Pt5B | 100 | 92Co4Ta4Zr | 150 | 1.3 |
| EXAMPLE 37 | NiAl | 50 | CrMo | 15 | Co22Cr12Pt5B | 150 | 92Co4Ta4Zr | 150 | 1.3 |
| EXAMPLE 38 | — | — | Cr | 50 | CoSm | 50 | 92Co4Ta4Zr | 150 | 1.3 |

| | ORIENTATION CONTROL FILM | | PERPENDICULAR MAGNETIZATION FILM | Δθ 50 (ori) (degree) | Δθ 50 (mag) (degree) | DIFFERENCE IN Δθ 50 (degree) | READ/WRITE CHARACTERISTICS ERROR RATE $10^X$ |
|---|---|---|---|---|---|---|---|
| | COMPOSITION | THICKNESS | | | | | |
| EXAMPLE 1 | Ru | 20 | (*1) | 6.6 | 8.8 | 2.2 | −6.1 |
| EXAMPLE 34 | Ru | 20 | (*1) | 5.5 | 8.3 | 2.8 | −6.1 |
| EXAMPLE 35 | Ru | 20 | (*1) | 5.6 | 8.3 | 2.7 | −6.2 |
| EXAMPLE 36 | Ru | 20 | (*1) | 6.1 | 8.4 | 2.3 | −5.9 |
| EXAMPLE 37 | Ru | 20 | (*1) | 6.2 | 8.3 | 2.1 | −5.8 |
| EXAMPLE 38 | Ru | 30 | (*1) | 6.2 | 8.4 | 2.2 | −5.7 |

(Thickness unit: nm)
(*1 Composition; 65Co17Cr16Pt2B, thickness; 25 nm)

TABLE 6

| | SOFT MAGNETIC UNDERCOAT FILM | | | ORIENTATION CONTROL FILM | | PERPENDICULAR MAGNETIZATION FILM | |
|---|---|---|---|---|---|---|---|
| | COMPOSITION | THICKNESS | Bs (T) | COMPOSITION | THICKNESS | COMPOSITION | THICKNESS |
| EXAMPLE 1 | 92Co4Ta4Zr | 150 | 1.3 | Ru | 20 | 65Co17Cr16Pt2B | 25 |
| EXAMPLE 39 | 92Co4Ta4Zr | 150 | 1.3 | Ru | 20 | 65Co17Cr16Pt2B | 3 |
| EXAMPLE 40 | 92Co4Ta4Zr | 150 | 1.3 | Ru | 20 | 65Co17Cr16Pt2B | 8 |
| EXAMPLE 41 | 92Co4Ta4Zr | 150 | 1.3 | Ru | 20 | 65Co17Cr16Pt2B | 45 |
| EXAMPLE 42 | 92Co4Ta4Zr | 150 | 1.3 | Ru | 20 | 65Co17Cr16Pt2B | 60 |
| EXAMPLE 43 | 92Co4Ta4Zr | 150 | 1.3 | Ru | 20 | 62Co19Cr15Pt3Mn | 25 |
| EXAMPLE 44 | 92Co4Ta4Zr | 150 | 1.3 | Ru | 20 | 68Co21Cr6Pt5B | 25 |
| EXAMPLE 45 | 92Co4Ta4Zr | 150 | 1.3 | Ru | 20 | 62Co17Cr21Pt | 25 |
| EXAMPLE 46 | 92Co4Ta4Zr | 150 | 1.3 | Ru | 20 | Co/Pd(*1) | 15 |

| | Δθ 50 (ori) (degree) | Δθ 50 (mag) (degree) | DIFFERENCE IN Δθ 50 (degree) | READ/WRITE CHARACTERISTICS ERROR RATE $10^{-X}$ | THERMAL STABILITY (%/decade) |
|---|---|---|---|---|---|
| EXAMPLE 1 | 6.6 | 8.8 | 2.2 | −6.1 | 0.65 |
| EXAMPLE 39 | 6.4 | 13.1 | 6.7 | −4.9 | 1.71 |
| EXAMPLE 40 | 6.6 | 12.7 | 6.1 | −5.9 | 0.98 |
| EXAMPLE 41 | 6.5 | 8.6 | 2.1 | −5.8 | 0.55 |
| EXAMPLE 42 | 6.5 | 7.7 | 1.2 | −5.1 | 0.42 |
| EXAMPLE 43 | 6.8 | 9.8 | 3.0 | −6.1 | 0.71 |

TABLE 6-continued

| | | | | | |
|---|---|---|---|---|---|
| EXAMPLE 44 | 6.3 | 10.3 | 4.0 | −6.3 | 1.45 |
| EXAMPLE 45 | 6.6 | 8.4 | 1.8 | −5.6 | 0.49 |
| EXAMPLE 46 | 6.7 | 10.1 | 3.4 | −5.3 | 0.36 |

(Thickness unit: nm)
(*1 Multi-layer structure film wherein Co layer and Pd layer are laminated many times

TABLE 7

| | SOFT MAGNETIC UNDERCOAT FILM | | | | | | ORIENTATION CONTROL FILM | |
|---|---|---|---|---|---|---|---|---|
| | COMPOSITION | THICKNESS | Bs (T) | EXPOSURE GAS (PROCESS GAS) | OXIDIZING TREATMENT | OXIDE LAYER THICKNESS | COMPOSITION | THICKNESS |
| EXAMPLE 1 | 92Co4Ta4Zr | 150 | 1.3 | — | — | — | Ru | 20 |
| EXAMPLE 47 | 92Co4Ta4Zr | 150 | 1.3 | 100%O$_2$ | EXPOSURE | 0.5 | Ru | 20 |
| EXAMPLE 48 | 92Co4Ta4Zr | 150 | 1.3 | 100%O$_2$ | EXPOSURE | 2.5 | Ru | 20 |
| EXAMPLE 49 | 92Co4Ta4Zr | 150 | 1.3 | 100%O$_2$ | EXPOSURE | 4 | Ru | 20 |
| EXAMPLE 50 | 92Co4Ta4Zr | 150 | 1.3 | 50%O$_2$—50%Ar | EXPOSURE | 1 | Ru | 20 |
| EXAMPLE 51 | 92Co4Ta4Zr | 150 | 1.3 | 10%O$_2$—90%Ar | (*2) | 1 | Ru | 20 |

| | PERPENDICULAR MAGNETIZATION FILM | Δθ50 (ori) (degree) | Δθ50 (mag) (degree) | DIFFERENCE IN Δθ50 (degree) | READ/WRITE CHARACTERISTICS ERROR RATE $10^x$ |
|---|---|---|---|---|---|
| EXAMPLE 1 | (*1) | 6.6 | 8.8 | 2.2 | −6.1 |
| EXAMPLE 47 | (*1) | 7.0 | 9.3 | 2.3 | −7.1 |
| EXAMPLE 48 | (*1) | 7.0 | 9.1 | 2.1 | −6.9 |
| EXAMPLE 49 | (*1) | 7.5 | 9.7 | 2.2 | −6.1 |
| EXAMPLE 50 | (*1) | 6.8 | 8.5 | 1.7 | −6.8 |
| EXAMPLE 51 | (*1) | 7.8 | 9.8 | 2.0 | −6.7 |

(Thickness unit: nm)
(*1 Composition; 65Co17Cr16Pt2B, thickness; 25 nm
(*2 10%O$_2$—90%Ar was used after using 100%Ar as a process gas during the formation of a soft magnetic undercoat film

TABLE 8

| | SOFT MAGNETIC UNDERCOAT FILM | | | ORIENTATION CONTROL FILM | | NON-MAGNETIC INTERMEDIATE FILM | |
|---|---|---|---|---|---|---|---|
| | COMPOSITION | THICKNESS | Bs (T) | COMPOSITION | THICKNESS | COMPOSITION | THICKNESS |
| EXAMPLE 1 | 92Co4Ta4Zr | 150 | 1.3 | Ru | 20 | — | — |
| EXAMPLE 52 | 92Co4Ta4Zr | 150 | 1.3 | Ru | 20 | 60Co40Cr | 5 |
| EXAMPLE 53 | 92Co4Ta4Zr | 150 | 1.3 | Ru | 20 | 60Co40Cr | 2 |
| EXAMPLE 54 | 92Co4Ta4Zr | 150 | 1.3 | Ru | 20 | 60Co40Cr | 18 |
| EXAMPLE 55 | 92Co4Ta4Zr | 150 | 1.3 | Ru | 20 | 60Co40Cr | 25 |
| EXAMPLE 56 | 92Co4Ta4Zr | 150 | 1.3 | Ru | 20 | 55Co35Cr10Mn | 5 |
| EXAMPLE 57 | 92Co4Ta4Zr | 150 | 1.3 | Ru | 20 | 52Co33Cr10Pt5B | 5 |
| EXAMPLE 58 | 92Co4Ta4Zr | 150 | 1.3 | Ru | 20 | 70Co30Ru | 5 |
| EXAMPLE 59 | 92Co4Ta4Zr | 150 | 1.3 | Ru | 20 | 60Co30Cr5Ta5B | 5 |

| | PERPENDICULAR MAGNETIZATION FILM | Δθ50 (ori) (degree) | Δθ50 (mag) (degree) | DIFFERENCE IN Δθ50 (degree) | READ/WRITE CHARACTERISTICS ERROR RATE $10^x$ | THERMAL STABILITY (%/decade) |
|---|---|---|---|---|---|---|
| EXAMPLE 1 | (*1) | 6.6 | 8.8 | 2.2 | −6.1 | 0.65 |
| EXAMPLE 52 | (*1) | 6.4 | 8.7 | 2.3 | −6.8 | 0.55 |
| EXAMPLE 53 | (*1) | 6.3 | 8.6 | 2.3 | −6.8 | 0.57 |
| EXAMPLE 54 | (*1) | 6.5 | 9.0 | 2.5 | −6.7 | 0.52 |
| EXAMPLE 55 | (*1) | 6.5 | 8.8 | 2.3 | −6.4 | 0.52 |
| EXAMPLE 56 | (*1) | 6.6 | 8.1 | 1.5 | −6.8 | 0.56 |
| EXAMPLE 57 | (*1) | 6.8 | 8.4 | 1.6 | −6.8 | 0.55 |
| EXAMPLE 58 | (*1) | 6.6 | 8.3 | 1.7 | −7.0 | 0.58 |
| EXAMPLE 59 | (*1) | 6.7 | 9.4 | 2.7 | −6.7 | 0.54 |

(Thickness unit: nm)
(*1 Composition; 65Co17Cr16Pt2B, thickness; 25 nm

TABLE 9

| | SOFT MAGNETIC UNDERCOAT FILM | | | ORIENTATION CONTROL FILM | | PERPENDICULAR MAGNETIZATION | NON-MAGNETIC INTERMEDIATE FILM | |
|---|---|---|---|---|---|---|---|---|
| | COMPOSITION | THICKNESS | Bs (T) | COMPOSITION | THICKNESS | FILM | COMPOSITION | THICKNESS |
| EXAMPLE 1 | 92Co4Ta4Zr | 150 | 1.3 | Ru | 20 | (*1 | — | — |
| EXAMPLE 60 | 92Co4Ta4Zr | 150 | 1.3 | Ru | 20 | (*1 | 92Co4Ta4Zr | 3.6 |
| EXAMPLE 61 | 92Co4Ta4Zr | 150 | 1.3 | Ru | 20 | (*1 | 92Co4Ta4Zr | 7.0 |
| EXAMPLE 62 | 92Co4Ta4Zr | 150 | 1.3 | Ru | 20 | (*1 | 92Co4Ta4Zr | 9.6 |
| EXAMPLE 63 | 92Co4Ta4Zr | 150 | 1.3 | Ru | 20 | (*1 | 85Fe15Zr | 3.6 |
| EXAMPLE 64 | 92Co4Ta4Zr | 150 | 1.3 | Ru | 20 | (*1 | 89Co4Zr7Nb | 3.6 |

| | | | | READ/WRITE CHARACTERISTICS | | |
|---|---|---|---|---|---|---|
| | $\Delta\theta 50$ (ori) (degree) | $\Delta\theta 50$ (mag) (degree) | DIFFERENCE IN $\Delta\theta 50$ (degree) | ERROR RATE $10^x$ | REPLAY OUTPUT (Mv) | THERMAL STABILITY (%/decade) |
| EXAMPLE 1 | 6.6 | 8.8 | 2.2 | −6.1 | 2180 | 0.65 |
| EXAMPLE 60 | 6.8 | 8.9 | 2.1 | −6.8 | 2870 | 0.45 |
| EXAMPLE 61 | 6.3 | 8.6 | 2.3 | −6.8 | 2350 | 0.53 |
| EXAMPLE 62 | 6.7 | 8.6 | 1.9 | −6.7 | 1780 | 0.84 |
| EXAMPLE 63 | 6.5 | 8.8 | 2.3 | −6.4 | 2660 | 0.52 |
| EXAMPLE 64 | 6.6 | 8.5 | 1.9 | −6.8 | 1720 | 0.51 |

(Thickness unit: nm)
(*1 Composition; 65Co17Cr16Pt2B, thickness; 25 nm

As is apparent from Table 1 and Table 2, in the examples wherein $\Delta\theta 50$ was set within a range from 3 to 10 degrees, the resulting magnetic read/write characteristics and the thermal decay are superior to the examples wherein $\Delta\theta 50$ was not set within above range.

As is apparent from Table 1 to Table 3, excellent magnetic read/write characteristics and thermal decay were obtained by setting ($\Delta\theta 50$ (mag)−$\Delta\theta 50$ (ori)) within a range from 1 to 8 degrees.

As is apparent from Table 4, excellent magnetic read/write characteristics were obtained by setting Bs·t of the oft magnetic undercoat film 2 to 30 T·nm or higher.

As is apparent from Table 5, sufficient magnetic read/write characteristics were obtained by providing the in-plane soft magnetic film 9.

As is apparent from Table 6, sufficient magnetic read/write characteristics and thermal decay were obtained by setting the thickness of the perpendicular magnetization film 4 within a range from 8 to 100 nm.

As is apparent from Table 7, magnetic read/write characteristics could be improved by the oxidation treatment to the soft magnetic undercoat film 2.

As is apparent from Table 8, the magnetic read/write characteristics and thermal decay could be improved by providing the non-magnetic intermediate film 8.

As is apparent from Table 9, the replay output could be improved by providing the magnetizing stabilization film 12.

As described above, in the magnetic recording medium of the present invention, since $\Delta\theta 50$ of the specific orientation plane is set within a range from 3 to 10 degrees, and a difference ($\Delta\theta 50$ (mag)−$\Delta\theta 50$ (ori)) between $\Delta\theta 50$ (ori) of the orientation control film and $\Delta\theta 55$ (mag) of the perpendicular magnetization film is set within a range from 1 to 8 degrees, excellent thermal decay can be obtained without deteriorating the noise characteristics and the magnetic read/write characteristics.

What is claimed is:

1. A magnetic recording medium comprising at least a soft magnetic undercoat film made of a soft magnetic material, an orientation control film that controls the orientation of a film provided directly above, a perpendicular magnetization film, of which axis of easy magnetization is generally oriented perpendicular to a substrate, and a protective film, that are provided, in order, on a non-magnetic substrate, wherein
the orientation control film has an hcp structure and, at the same time, $\Delta\theta 50$ of the (0002) orientation plane is set within a range from 3 to 10 degrees and a difference ($\Delta\theta 50$ (mag)−$\Delta\theta 50$ (ori)) between $\Delta\theta 50$ (ori) of the orientation control film and $\Delta\theta 50$ (mag) of the perpendicular magnetization film is set within a range from 1 to 8 degrees.

2. The magnetic recording medium according to claim 1, wherein the orientation control film contains 50 at % or higher of one or more elements selected from Ti, Zn, Y, Zr, Ru, Re, Gd, Tb and Co.

3. The magnetic recording medium according to claim 2, wherein the orientation control film contains one or more elements selected from V, Cr, Mn, Fe, Co and Ni.

4. The magnetic recording medium according to claim 2, wherein the orientation control film contains one or more elements selected from B, C, N, O and P.

5. The magnetic recording medium according to claim 1, wherein the orientation control film is made of any one of 25Ag75Ge, 50Cu50Ge and 75Ru25Nb.

6. The magnetic recording medium according to any one of claims 1 to 5, wherein a non-magnetic intermediate film is provided between the orientation control film and the perpendicular magnetization film, while the non-magnetic intermediate film is made of a material containing 40 to 70 at % of Co.

7. The magnetic recording medium according to any one of claims 1 to 5, wherein the orientation control film has a granular structure and has a mean crystal grain diameter of 4 to 20 nm.

8. A magnetic recording medium at least comprising a soft magnetic undercoat film made of a soft magnetic material, an orientation control film that controls the orientation of a film provided directly above, a perpendicular magnetization film, of which the axis of easy magnetization is generally oriented perpendicular to a substrate, and a protective film, that are provided on a non-magnetic substrate, wherein the orientation control film has an fcc structure and, at the same time, $\Delta\theta 50$ of the (111) orientation plane is set within a range from 3 to 10 degrees and a difference ($\Delta\theta 50$ (mag)–$\Delta\theta 50$ (ori)) between $\Delta\theta 50$ (ori) of the orientation control film and $\Delta\theta 50$ (mag) of the perpendicular magnetization film is set within a range from 1 to 8 degrees.

9. The magnetic recording medium according to claim 8, wherein the orientation control film includes more than 50 at. % of one or more of the elements selected from a group consisted of Ni, Cu, Pd, Ag, Pt, Ir, Au, and Al.

10. The magnetic recording medium according to any one of claims 1 to 5, 8 and 9, wherein Negative nucleation field (–Hn) of the perpendicular magnetization film is equal to or higher than 0(Oe).

11. A method of manufacturing a magnetic recording medium, which comprises forming at least a soft magnetic undercoat film made of a soft magnetic material, an orientation control film that controls the orientation of a film provided right above, a perpendicular magnetization film of which axis of easy magnetization is generally oriented perpendicular to a substrate, and a protective film, on a non-magnetic substrate, while controlling so that the orientation control film has a fcc structure and, at the same time, $\Delta\theta 50$ of the (111) orientation plane is set within a range from 3 to 10 degrees and the difference ($\Delta\theta 50$ (mag)–$\Delta\theta 50$ (ori)) between $\Delta\theta 50$ (ori) of the orientation control film and $\Delta\theta 50$ (mag) of the perpendicular magnetization film is set within a range from 1 to 8 degrees.

12. A magnetic read/write apparatus comprising a magnetic recording medium and a magnetic head that records information on the magnetic recording medium and replays the information, wherein the magnetic recording medium comprises at least a soft magnetic undercoat film made of a soft magnetic material, an orientation control film that controls the orientation of a film provided directly above, a perpendicular magnetization film of which the axis of easy magnetization is generally oriented perpendicular to a substrate, and a protective film, that are provided on a non-magnetic substrate, while the orientation control film has a fcc structure and, at the same time, $\Delta\theta 50$ of the (111) orientation plane is set within a range from 3 to 10 degrees and the difference ($\Delta\theta 50$ (mag)–$\Delta\theta 50$ (ori)) between $\Delta\theta 50$ (ori) of the orientation control film and $\Delta\theta 50$ (mag) of the perpendicular magnetization film is set within a range from 1 to 8 degrees.

13. A method of manufacturing a magnetic recording medium, which comprises forming at least a soft magnetic undercoat film made of a soft magnetic material, an orientation control film that controls the orientation of a film provided right above, a perpendicular magnetization film of which axis of easy magnetization is generally oriented perpendicular to a substrate, and a protective film, in order, on a non-magnetic substrate, while controlling so that the orientation control film has an hcp structure and, at the same time, $\Delta\theta 50$ of the (0002) orientation plane is set within a range from 3 to 10 degrees and the difference ($\Delta\theta 50$ (mag)–$\Delta\theta 50$ (ori)) between $\Delta\theta 50$ (ori) of the orientation control film and $\Delta\theta 50$ (mag) of the perpendicular magnetization film is set within a range from 1 to 8 degrees.

14. A magnetic read/write apparatus comprising a magnetic recording medium and a magnetic head that records information on the magnetic recording medium and replays the inflation, wherein the magnetic recording medium comprises at least a soft magnetic undercoat film made of a soft magnetic material, an orientation control film that controls the orientation of a film provided directly above, a perpendicular magnetization film of which the axis of easy magnetization is generally oriented perpendicular to a substrate, and a protective film, that are provided, in order, on a non-magnetic substrate, while the orientation control film has an hcp and, at the same time, $\Delta\theta 50$ of the (0002) orientation plane is set within a range from 3 to 10 degrees and the difference ($\Delta\theta 50$ (mag)–$\Delta\theta 50$ (ori)) between $\Delta\theta 50$ (ori) of the orientation control film and $\Delta\theta 50$ (mag) of the perpendicular magnetization film is set within a range from 1 to 8 degrees.

\* \* \* \* \*